US009973903B2

(12) United States Patent
Cherian et al.

(10) Patent No.: US 9,973,903 B2
(45) Date of Patent: May 15, 2018

(54) TRAFFIC ADVERTISEMENT IN A NETWORK

(71) Applicant: QUALCOMM Incorporated, San Diego, CA (US)

(72) Inventors: George Cherian, San Diego, CA (US); Abhishek Pramod Patil, San Diego, CA (US); Rajesh Kumar, San Diego, CA (US); Santosh Paul Abraham, San Diego, CA (US); Anurag Vardhan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 15/158,393

(22) Filed: May 18, 2016

(65) Prior Publication Data

US 2016/0353253 A1 Dec. 1, 2016

Related U.S. Application Data

(60) Provisional application No. 62/167,816, filed on May 28, 2015.

(51) Int. Cl.
*H04W 4/06* (2009.01)
*H04L 5/00* (2006.01)
(Continued)

(52) U.S. Cl.
CPC ............. *H04W 4/06* (2013.01); *H04L 1/1614* (2013.01); *H04L 1/1854* (2013.01);
(Continued)

(58) Field of Classification Search
CPC ...... H04L 1/1614; H04L 1/1854; H04L 43/16; H04L 5/0055; H04W 4/06;
(Continued)

(56) References Cited

U.S. PATENT DOCUMENTS 9,723,581 B2 * 8/2017 Patil .................... H04W 56/001
2006/0050742 A1 * 3/2006 Grandhi ............ H04W 74/0816
370/506

(Continued)

OTHER PUBLICATIONS

Hu, Chunyu et al., "LISP: A link-Indexed Statistical Traffic Prediction Approach to Improving IEEE 802.11 PSM", Distributed Computing Systems, Proceedings 24th International Conference on Hachioji, Tokyo, Japan, Piscataway, NJ, USA,IEEE, Mar. 24, 2004 (Mar. 24, 2004), XP010692677, pp. 292-300.

(Continued)

*Primary Examiner* — Stephen J Clawson
(74) *Attorney, Agent, or Firm* — Toler Law Group, PC.

(57) ABSTRACT

A device for communication includes a processor, a transmitter, and a receiver. The processor is configured to generate a traffic advertisement indicating availability of data to be sent to a plurality of devices. The traffic advertisement includes a unicast message addressed to a first device of the plurality of devices. The transmitter is configured to transmit the traffic advertisement during a paging window. The receiver is configured to receive, during a data transmission window that is subsequent to the paging window, a data request from a second device of the plurality of devices. The data request is responsive to the traffic advertisement. The transmitter is further configured to send first data to the second device responsive to the data request.

30 Claims, 15 Drawing Sheets

(51) Int. Cl.
*H04L 1/16* (2006.01)
*H04L 12/26* (2006.01)
*H04L 1/18* (2006.01)
*H04W 52/02* (2009.01)
*H04W 68/00* (2009.01)

(52) U.S. Cl.
CPC ............ *H04L 5/0055* (2013.01); *H04L 43/16* (2013.01); *H04W 52/0216* (2013.01); *H04W 52/0241* (2013.01); *H04W 68/00* (2013.01); *Y02D 70/00* (2018.01); *Y02D 70/142* (2018.01); *Y02D 70/144* (2018.01); *Y02D 70/166* (2018.01); *Y02D 70/22* (2018.01); *Y02D 70/23* (2018.01)

(58) Field of Classification Search
CPC ......... H04W 52/0216; H04W 52/0219; H04W 68/00; H04W 8/005
See application file for complete search history.

(56) References Cited

U.S. PATENT DOCUMENTS

| | | | | |
|---|---|---|---|---|
| 2007/0242634 | A1* | 10/2007 | Calcev | H04W 52/0225 370/318 |
| 2015/0071121 | A1* | 3/2015 | Patil | H04W 40/24 370/255 |
| 2015/0350334 | A1* | 12/2015 | Liu | H04L 67/141 709/227 |
| 2016/0174136 | A1* | 6/2016 | Patil | H04L 12/18 370/312 |
| 2016/0174137 | A1* | 6/2016 | Patil | H04W 8/14 370/310 |
| 2016/0174196 | A1* | 6/2016 | Patil | H04L 5/0055 370/329 |
| 2016/0174219 | A1* | 6/2016 | Patil | H04L 5/0055 370/329 |
| 2016/0174220 | A1* | 6/2016 | Patil | H04L 61/6022 370/329 |
| 2016/0174221 | A1* | 6/2016 | Patil | H04L 5/0055 370/329 |
| 2016/0174225 | A1* | 6/2016 | Patil | H04W 68/005 370/329 |
| 2016/0309496 | A1* | 10/2016 | Huang | H04W 52/0216 |
| 2016/0353253 | A1* | 12/2016 | Cherian | H04W 4/06 |
| 2017/0317938 | A1* | 11/2017 | Abraham | H04L 9/34 |
| 2017/0346708 | A1* | 11/2017 | Patil | H04W 72/005 |

OTHER PUBLICATIONS

International Search Report and Written Opinion—PCT/US2016/033350—ISA/EPO—dated Dec. 21, 2016.
Kim, Hyu-Dae, et al., "An Efficient Power-saving Protocol for Internet Traffic in Wireless LANs," Vehicular Technology Conference, 2005. VTC-2005-Fall. 2005 IEEE 62nd Dallas, TX, USA Sep. 25-28, 2005, Piscataway, NJ, USA, IEEE, vol. 2, Sep. 25, 2005 (Sep. 25, 2005), pp. 784-788, XP010878590, DOI: 10.1109/VETECF.2005.1558031 ISBN: 978-0-7803-9152-9.
Kwon, Sang-Wook, et al., "Efficient Power Management Scheme Considering Inter-User QoS in Wireless LAN", IEEE 64th Vehicular Technology Conference, VTC 2006—Fall ; Sep. 25-28, 2006, Montreal, Quebec, Canada,Piscataway, NJ : IEEE Operations Center, Sep. 2006 (Sep. 1, 2006), XP031051493, pp. 1-5.
Lim, Sunho, et al., "RandomCast: An Energy-Efficient Communication Scheme for Mobile Ad Hoc Networks", vol. 8, No. 8, Aug. 1, 2009 (Aug. 1, 2009), XP011335377, pp. 1039-1051.
Daniel C M., et al., "Enabling always on service discovery: Wifi neighbor awareness networking", IEEE Wireless Communications, IEEE Service Center, Piscataway, NJ, US, vol. 22, No. 2, Apr. 1, 2015 (Apr. 1, 2015), pp. 118-125, XP011579866, ISSN: 1536-1284, DOI: 10.1109/MWC.2015.7096294 [retrieved on Apr. 27, 2015] abstract p. 128, left-hand column, paragraph 2.
Partial International Search Report—PCT/US2016/033350—ISA/EPO—Sep. 22, 2016.
Wanang X., et al., "A Power-Saving Scheme for IEEE 802.11 Ad hoc Networks", 2006 6th International Conference on ITS Telecommunications Proceedings, XP031012504, Jun. 1, 2006 (Jun. 1, 2006), pp. 638-641.

* cited by examiner

TRAFFIC ADVERTISEMENT IN A NETWORK

I. CROSS-REFERENCE TO RELATED APPLICATIONS

The present application claims priority from U.S. Provisional Patent Application No. 62/167,816, filed May 28, 2015, entitled "TRAFFIC ADVERTISEMENT IN A NETWORK," the content of which is expressly incorporated herein by reference in its entirety.

II. FIELD

The present disclosure is generally related to traffic advertisement in a network.

III. DESCRIPTION OF RELATED ART

Advances in technology have resulted in smaller and more powerful computing devices. For example, there exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Electronic devices, such as wireless telephones, may use wireless connections to access networks in order to transmit and receive data or to exchange information. For example, mobile electronic devices that are in close proximity to each other may form a wireless mesh network to perform data exchange via the wireless mesh network (e.g., without involving wireless carriers, Wi-Fi access points, or the Internet). To enable functionality of the wireless mesh network, a particular wireless channel of the particular wireless network may be reserved for transferring data between electronic devices of the wireless mesh network. For example, a "provider" device of the wireless mesh network may share a service, such as a music service, with other electronic devices in the wireless mesh network. To illustrate, the provider device may transmit music data to a subscriber device in the wireless mesh network. Because the subscriber device does not know when the provider device will transmit the music data, the subscriber device may substantially continuously monitor the wireless mesh network for transmissions from the provider device. Accordingly, the subscriber device consumes power to monitor the wireless mesh network, even during time periods when the provider device is not transmitting data to the subscriber device.

IV. SUMMARY

In a particular aspect, a device for communication includes a processor, a transmitter, and a receiver. The processor is configured to generate a traffic advertisement indicating availability of data to be sent to a plurality of devices. The traffic advertisement includes a unicast message addressed to a first device of the plurality of devices. The transmitter is configured to transmit the traffic advertisement during a paging window. The receiver is configured to receive, during a data transmission window that is subsequent to the paging window, a data request from a second device of the plurality of devices. The data request is responsive to the traffic advertisement. The transmitter is further configured to send first data to the second device responsive to the data request.

In another aspect, a method of communication includes generating a traffic advertisement at a particular device. The traffic advertisement indicates availability of data to be sent by the particular device to one or more devices. The method also includes sending, from the particular device, the traffic advertisement during a paging window. The method further includes monitoring a communication channel during a first portion of a window that is subsequent to the paging window irrespective of whether an acknowledgment (ACK) responsive to the traffic advertisement is received during the paging window.

In another aspect, a device for communication includes a receiver and a transmitter. The receiver is configured to receive a traffic advertisement from a particular device during a paging window. The traffic advertisement indicates availability of data to be sent by the particular device to one or more devices. The traffic advertisement includes a unicast message addressed to a first device of the one or more devices. The transmitter is configured to send an acknowledgment (ACK) to the particular device irrespective of whether the unicast message is addressed to the receiver. The ACK is responsive to the traffic advertisement.

In another aspect, a method of communication includes receiving a traffic advertisement at a first device from a particular device during a paging window. The traffic advertisement indicates availability of data to be sent by the particular device to one or more devices. The traffic advertisement includes a unicast message addressed to a second device of the one or more devices. The method also includes sending an acknowledgment (ACK) to the particular device irrespective of whether the unicast message is addressed to the first device. The ACK is responsive to the traffic advertisement.

In another aspect, a method of communication includes generating a traffic advertisement at a particular device. The traffic advertisement indicates availability of data to be sent by the particular device to one or more devices. The method also includes sending, from the particular device, the traffic advertisement during a paging window. The method further includes sending first data, via a communication channel, to a first device of the one or more devices during a data transmission window that is subsequent to the paging window. The method also includes, in response to determining that there is no remaining data to be sent by the particular device to the first device during the data transmission window, sending an indicator indicating that the particular device has no more data to send to the first device during the data transmission window.

In another aspect, a method of communication includes receiving a traffic advertisement at a first device from a particular device during a paging window. The traffic advertisement indicates availability of data to be sent by the particular device to one or more devices that include the first device. The method also includes receiving first data, via a communication channel, at the first device from the particular device during a data transmission window that is subsequent to the paging window. The method further includes determining that the first data includes an indicator indicating that the particular device has no more data to send to the first device during the data transmission window. The method also includes, in response to the determination, refraining from monitoring the communication channel, transitioning to a low-power operating mode, performing actions related to another network, or a combination thereof, during a remaining portion of the data transmission window.

In another aspect, a method of communication includes generating a traffic advertisement at a particular device. The traffic advertisement indicates availability of data to be sent by the particular device to one or more devices. The traffic advertisement is addressed to a first device of the one or more devices. The method also includes sending, from the particular device, the traffic advertisement during a paging window. The method further includes monitoring a communication channel during a window that is subsequent to the paging window irrespective of whether an acknowledgment (ACK) is received from the first device during the paging window. The method further includes receiving a data request via the communication channel from a second device of the one or more devices during the window. The method also includes, in response to receiving the data request from the second device, sending first data to the second device.

In another aspect, a method of communication includes generating a traffic advertisement at a particular device. The traffic advertisement indicates availability of data to be sent by the particular device to one or more devices. The traffic advertisement is addressed to a first device of the one or more devices. The method also includes sending, from the particular device, the traffic advertisement during a paging window. The method further includes monitoring a communication channel during a first portion of a window that is subsequent to the paging window irrespective of whether an acknowledgment (ACK) is received from the first device during the paging window. The method also includes determining that no data request has been received from the one or more devices via the communication channel during the first portion of the window. The method also includes, in response to the determination, refraining from sending the data to the one or more devices, transitioning to a low-power operating mode, performing actions related to another network, or a combination thereof, during at least a remaining portion of the window.

In another aspect, a method of communication includes generating a traffic advertisement at a particular device. The traffic advertisement indicates availability of data to be sent by the particular device to one or more devices. The method also includes sending, from the particular device, the traffic advertisement during a paging window. The method further includes receiving an acknowledgment (ACK) from an acknowledging device of the one or more devices during a first interval subsequent to sending the traffic advertisement. The method also includes sending first data to a first device of the one or more devices during a data transmission window that is subsequent to the paging window.

In another aspect, a method of communication includes receiving a traffic advertisement at a first device from a particular device during a paging window. The traffic advertisement indicates availability of data to be sent by the particular device to multiple devices. The traffic advertisement is addressed to a second device of the multiple devices. The method also includes determining that the traffic advertisement indicates availability of data to be sent by the particular device to the first device and that no ACK is detected from the second device to the particular device during an interval subsequent to receiving the traffic advertisement. The method further includes, in response to the determination, sending an ACK to the particular device subsequent to the interval during the paging window.

In another aspect, a method of communication includes generating a traffic advertisement at a particular device. The traffic advertisement indicates availability of data to be sent by the particular device to one or more devices of a set of devices. The method also includes sending, from the particular device, the traffic advertisement during a paging window. The method further includes determining that an acknowledgment (ACK) is received from an acknowledging device of the set of devices during the paging window. The method also includes, in response to the determination, sending first data to a first device of the one or more devices during a data transmission window that is subsequent to the paging window.

In another aspect, a method of communication includes receiving a traffic advertisement at a first device from a particular device. The traffic advertisement indicates availability of data to be sent by the particular device to one or more devices. The first device is not included in the one or more devices. The method also includes sending an ACK from the first device to the particular device.

In another aspect, a method of communication includes receiving a traffic advertisement at a first device from a particular device during a paging window. The traffic advertisement indicates availability of data to be sent by the particular device to multiple devices. The traffic advertisement is addressed to a second device of the multiple devices. The traffic advertisement indicates one or more candidate devices of the multiple devices. The method also includes determining that the candidate devices include the first device and that no ACK is detected from the second device to the particular device during an interval subsequent to receiving the traffic advertisement. The method further includes, in response to the determination, sending an ACK to the particular device subsequent to the interval during the paging window.

In another aspect, a method of communication includes receiving a traffic advertisement at a first device from a particular device during a paging window. The traffic advertisement indicates availability of data to be sent by the particular device to multiple devices. The traffic advertisement indicates an acknowledgment (ACK) order of the multiple devices. The method also includes determining that the multiple devices include the first device and that no ACK is detected from the multiple devices to the particular device prior to an ACK time. The ACK time is based on a position of the first device in the ACK order. The method further includes, in response to the determination, sending an ACK to the particular device subsequent to the ACK time during the paging window.

In another aspect, a method of communication includes generating a traffic advertisement at a particular device. The traffic advertisement indicates availability of data to be sent by the particular device to one or more devices. The method also includes sending, from the particular device, the traffic advertisement during a paging window. The method further includes determining that no acknowledgment (ACK) is received during an interval subsequent to sending the traffic advertisement. The method also includes sending, from the particular device, a second traffic advertisement during the paging window subsequent to the interval in response to the determination.

In another aspect, a method of communication includes generating a traffic advertisement at a particular device. The traffic advertisement indicates availability of data to be sent by the particular device to one or more devices. The method also includes sending, from the particular device, the traffic advertisement during a paging window. The method further includes receiving an unavailability message, via a communication channel, from the first device during a data transmission window that is subsequent to the paging window. The method also includes, in response to receiving the unavailability message from the first device, refraining from sending first data from the particular device to the first device during the data transmission window.

In another aspect, a method of communication includes receiving a traffic advertisement at a first device from a particular device during a paging window. The traffic advertisement indicates availability of data to be sent by the particular device to one or more devices. The method also includes generating an unavailability message in response to determining that the first device is unavailable to receive the data from the particular device. The method further includes sending the unavailability message, via a communication channel, to the particular device subsequent to receiving the traffic advertisement. The method also includes, subsequent to sending the unavailability message, refraining from monitoring the communication channel, transitioning to a low-power operating mode, monitoring another communication channel, performing actions related to another network, or a combination thereof, during a remaining portion of the data transmission window.

In another aspect, a method of communication includes generating a traffic advertisement at a particular device. The traffic advertisement indicates availability of data to be sent by the particular device to multiple devices. The data includes first data to be sent to a first device of the multiple devices and second data to be sent to a second device of the multiple devices. The method also includes sending, from the particular device, the traffic advertisement during a paging window. The method further includes receiving a partial availability message from the first device subsequent to sending the traffic advertisement. The method also includes, in response to receiving the partial availability message from the first device, sending the first data to the first device during the data transmission window prior to sending the second data to the second device during the data transmission window.

In another aspect, a method of communication includes receiving a traffic advertisement at a first device from a particular device during a paging window. The traffic advertisement indicates availability of data to be sent by the particular device. The method also includes determining that the first device is expected to be unavailable to receive the data during a portion of a data transmission window. The method further includes, in response to the determination, sending a partial availability message from the first device to the particular device during the paging window or the data transmission window.

One particular advantage provided by at least one of the disclosed aspects is that if a particular electronic device does not receive a traffic advertisement or is not identified as a data recipient in the traffic advertisement, the particular electronic device may reduce power consumption by transitioning to the low-power operating mode during a portion of a transmission window or may perform operations corresponding to other data path links or other networks during the remaining portion of the transmission window.

Other aspects, advantages, and features of the present disclosure will become apparent after a review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
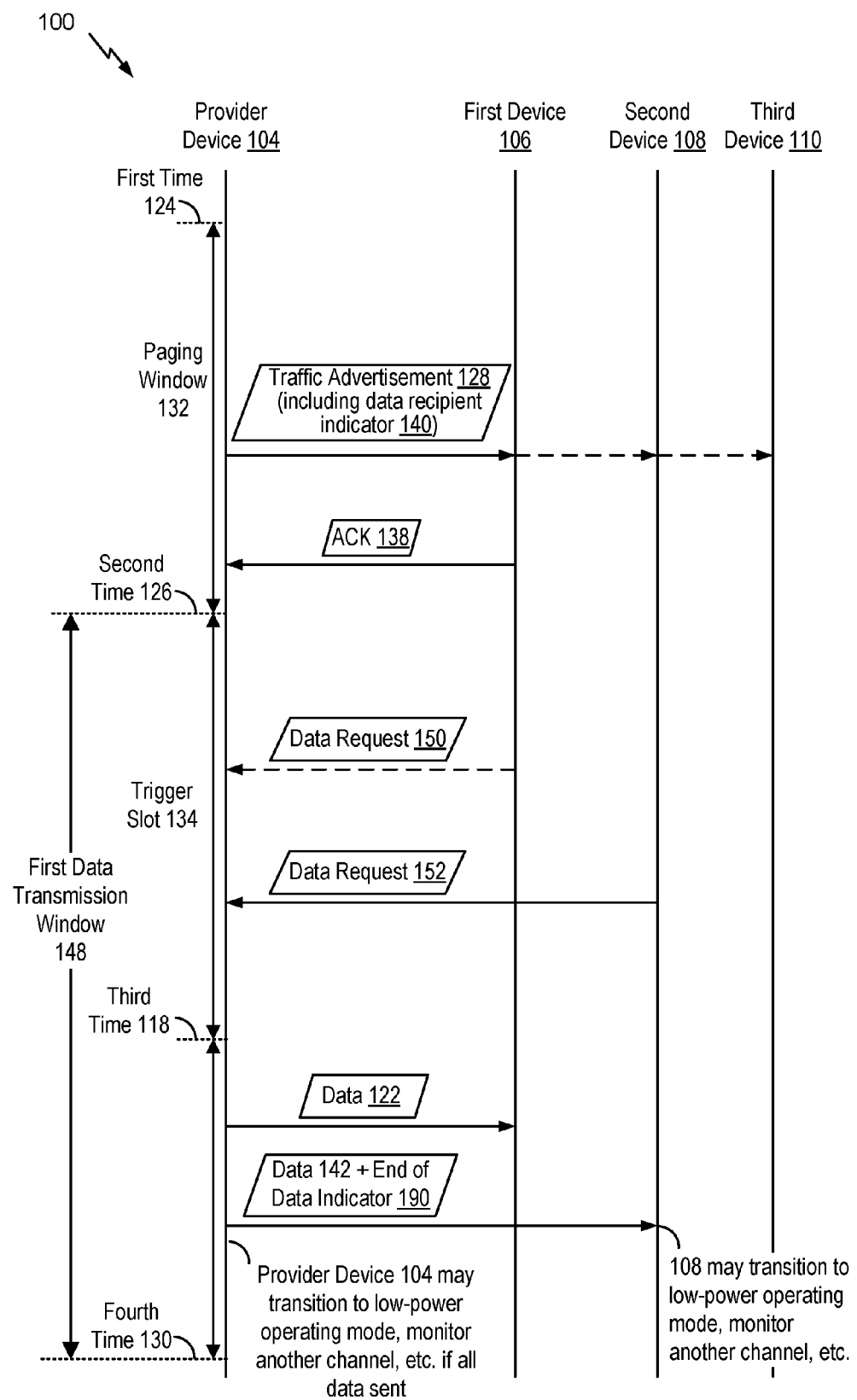
FIG. 1 is a ladder diagram corresponding to operation of a system that includes one or more electronic devices of a neighbor aware network data path link (NDL) that exchange a traffic advertisement.

The present disclosure is directed to systems and methods to enable electronic devices in a data path link of a neighbor aware network (alternatively referred to as neighbor awareness networking) (NAN) to use traffic advertisements to coordinate times to exchange traffic (e.g., data) of a particular service. As referred to herein, a "data path link" refers to one or more electronic devices that share a time period corresponding to an active operating mode of the electronic devices (e.g., a paging window) and that have shared security credentials. For example, a data path link may include or correspond to a wireless mesh network, such as a "social wireless fidelity (wi-fi) mesh (SWF-mesh)". The one or more electronic devices of the data path link may be a subset of electronic devices in the NAN. As referred to herein, "data link (DL)", "NAN Data Link (NDL)", "data path (DP)", "NAN DP (NDP)", or "NAN DP group" may refer to the data path link. Data exchanged via the data path link may be protected based on security credentials. A "data link identifier" may refer to an identifier indicating the data path link.

The data path link may be initiated by a provider device of the NAN sending a message (e.g., a service advertisement) to electronic devices of the NAN during a discovery window. The service advertisement may indicate that the provider device is available to provide a particular service via a plurality of logical channels. In a particular aspect, the service advertisement may indicate the data link identifier corresponding to the data path link. As referred to herein, a "discovery window" refers to a time period corresponding to an active operating mode of the electronic devices of the NAN. During the discovery window, one or more of the electronic devices of the NAN may monitor a NAN communication channel for service advertisements. The NAN communication channel may correspond to a particular wireless channel.

As referred to herein, a "logical channel" refers to the combination of a particular (physical) communication channel(s) and one or more time periods (e.g., one or more transmission windows) during which the electronic devices of the data path link may communicate regarding the particular service via the particular communication channel(s).

A subscriber device of the NAN may respond to a service advertisement by sending a subscribe message to the provider device. The provider device may perform data link setup by exchanging negotiation messages with the subscriber device. For example, the provider device may send a negotiation message to the subscriber device indicating an identifier (e.g., an association identifier (AID)) corresponding to the subscriber device. A particular data path link may correspond to the particular service and to the plurality of logical channels indicated in the service advertisement. For example, the particular data path link may include the provider device and one or more subscriber devices that sent a subscribe message responsive to the service advertisement. Each transmission window of a particular logical channel may include a portion of time during which the provider device of the data path link may send a traffic advertisement via the particular communication channel to a set of subscriber devices of the data path link. The traffic advertisement may indicate availability of data to be sent by the provider device. For example, the traffic advertisement may include (or indicate) an identifier sent to a subscriber device during data link setup to indicate availability of data to be sent to the subscriber device. The portion of time may correspond to a paging window, and the traffic advertisement may correspond to a paging message. Electronic devices of the data path link may monitor the (physical) communication channel(s) during at least a portion of one or more paging windows associated with the logical channel.

Particular aspects of the present disclosure are described below with reference to the drawings. In the description, common features are designated by common reference numbers throughout the drawings.

Referring to FIG. 1, a diagram is shown and generally designated diagram 100. The diagram 100 may correspond to operation of a system that includes one or more electronic devices. For example, the system may include a provider device 104, a first device 106, a second device 108, a third device 110, or a combination thereof. The devices 104-110 may be included in a first neighbor aware network (NAN). An electronic device may be configured to perform data exchanges via wireless communications with one or more other electronic devices of the first NAN. For example, a particular device of the devices 104-110 may be configured to perform data exchanges via wireless communications with another device of the devices 104-110. The data exchanges may be performed without involving wireless carriers, Wi-Fi access points, or the Internet.

The timing and operations shown in FIG. 1 are for illustration and are not limiting. In other aspects, additional or fewer operations may be performed and the timing may be different. In some aspects, the system may include more electronic devices or fewer electronic devices than illustrated in FIG. 1.

One or more of the devices 104-110 may include a traffic advertisement generator, a traffic advertisement analyzer, a transceiver, or a combination thereof. For example, one or more operations described herein as being performed by the provider device 104 may be performed by a receiver, a transmitter, a processor, a traffic advertisement generator of the provider device 104, or a combination thereof. As another example, one or more operations described herein as being performed by the device 106-110 may be performed by a receiver, a transmitter, a processor, a traffic advertisement analyzer of the device 106-110, or a combination thereof. In a particular implementation, each of the devices 104-110 may include the traffic advertisement generator and the traffic advertisement analyzer.

The devices 104-110 may include fixed location electronic devices and/or mobile electronic devices. For example, the devices 104-110 may include or correspond to mobile phones, laptop computers, tablet computers, personal computers, multimedia devices, peripheral devices, data storage devices, or a combination thereof. Additionally or alternatively, each of the devices 104-110 may include a processor, a memory, and a transceiver configured to send and receive data via one or more wireless networks, as further described with reference to FIG. 15. The processor may include at least one of a central processing unit (CPU), a digital signal processor (DSP), a network processing unit (NPU), or another processing unit. The memory may include at least one of a random access memory (RAM), a read-only memory (ROM), or another memory. The transceiver may include a wireless receiver and a wireless transmitter. The wireless networks may be associated with one or more wireless communication channels. Although certain operations described herein may be described with reference to a "transceiver," in other aspects a "receiver" may perform data receiving operations and a "transmitter" may perform data transmitting operations.

The devices 104-110 may exchange data, services, or both, via one or more wireless networks. As used herein, a transmission "via" a wireless network may include, but is not limited to, a "point-to-point" transmission between two electronic devices of the wireless network. A point-to-point transmission may correspond to unicast transmission. As another example, a transmission via the wireless network may include a communication that is "broadcast" from a particular electronic device of the wireless network to multiple other electronic devices of the wireless network. The devices 104-110 may be configured to operate in accordance with one or more wireless protocols or standards, such as an Institute of Electrical and Electronics Engineers (IEEE) 802.11 standard. For example, the devices 104-110 may operate in accordance with at least one of an IEEE 802.11a, b, g, n, s, aa, ac, ad, ae, af, ah, ai, aj, aq, ax, or mc standard. Additionally, the devices 104-110 may operate in accordance with one or more NAN standards or protocols.

One or more of the devices 104-110 may be configured to communicate with a cellular network via one or more cellular communication protocols or standards, such as a code division multiple access (CDMA) protocol, an orthogonal frequency division multiplexing (OFDM) protocol, an orthogonal frequency division multiple access (OFDMA) protocol, a time division multiple access (TDMA) protocol, a space division multiple access (SDMA) protocol, a carrier sense multiple access (CSMA) protocol, etc. Additionally, one or more of the devices 104-110 may be configured to operate in accordance with one or more near-field communications standards, such as a Bluetooth® standard (Bluetooth is a registered trademark of Bluetooth SIG, Inc. of Kirkland, Wash.). Additionally, one or more of the devices 104-110 may exchange data via infrared or other near-field communications.

The devices 104-110 may enter and exit the first NAN at various times during operation. For example, an electronic device that is not within the first NAN may detect a discovery beacon and may associate with the first NAN during a discovery window identified by the discovery beacon, in accordance with a NAN standard or protocol. Additionally, the devices 104-110 may disassociate from the first NAN at any time. While within the first NAN, the devices 104-110 may be configured to transmit or to receive messages indicating an availability to communicate via one or more logical channels. For example, the devices 104-110 may be configured to transmit or to receive service advertisements that advertise a service provided via one or more logical channels by at least one electronic device of the first NAN. A service advertisement may include or correspond to, or be included within a service discovery frame (SDF).

Additionally, while within the first NAN, the devices 104-110 may be configured to transmit or to receive synchronization beacons. A synchronization beacon may indicate synchronization information and may be formed in accordance with one or more NAN standards or protocols. The devices 104-110 may be configured to synchronize respective internal clocks based on the synchronization beacons. Because the internal clocks of the devices 104-110 may be synchronized, the devices 104-110 may determine a common time period to transition to an active operating mode and monitor the NAN communication channel for a service advertisement. The common time period may correspond to the discovery window of the NAN.

The devices 104-110 of a data path link may also use the synchronization information to determine a common time period to transition to the active operating mode and monitor a particular communication channel corresponding to a particular logical channel for a traffic advertisement. The common time period may correspond to a paging window of the data path link.

The synchronization beacons may be retransmitted (e.g., rebroadcast) by the devices 104-110 within the first NAN, in accordance with a NAN standard or protocol, to enable the synchronization beacons to reach electronic devices that are beyond a wireless communication range of the electronic device that transmits the synchronization beacon. In a particular aspect, the synchronization beacons may be transmitted between electronic devices of the first NAN via a first wireless channel. The first wireless channel may correspond to a "NAN communication channel." As referred to herein, a "NAN communication channel" is a particular wireless channel that is reserved for electronic devices to perform NAN discovery operations and NAN synchronization operations.

In addition to being included in the first NAN, the device 104-110 may be included in one or more data path links. Thus, a NAN may include zero or more data path links, and each device in the NAN may be a member of zero or more data path links. A data path link may correspond to a service provided via one or more logical channels by one or more provider devices of the NAN. For example, in FIG. 1, the provider device 104 may provide a particular service via the one or more logical channels to subscriber devices of the data path link, as described herein. The particular service may include at least one of a music service, a gaming service, a social media service, an advertising service, or a message sharing service. In a particular aspect, one or more additional provider devices may also provide the particular service via the one or more logical channels to the subscriber devices. As another example, the provider device 104 may be part of another network, and the provider device 104 may be configured to advertise the other network to enable other electronic devices of the first NAN to join the other network via the provider device 104. The other network may include an access point (AP) based network or an independent basic service set (IBSS) network.

Data path links may include "single-hop" data path links, "multi-hop" data path links, or both. A single-hop data path link may include one or more electronic devices that are within a wireless communication range of a provider device. A multi-hop data path link may include one or more electronic devices that are outside a wireless communication range of the provider device 104. In the multi-hop data path link, at least one electronic device may receive a message (including data) from the provider device 104 and may rebroadcast the message to another electronic device that outside of the wireless communication range of the provider device 104. In a particular aspect, a multi-hop data path link may include the devices 104-110. In this aspect, wireless communications from the provider device 104 to the third device 110 may be routed by the first device 106. For example, the first device 106 may retransmit wireless communications received from the provider device 104 to the third device 110. In another particular aspect, the data path link may be a single-hop data path link that includes the devices 104-110.

The provider device 104 may operate as a data source and may transmit data to other electronic devices of the data path link. For example, to share a music service, the provider device 104 may transmit music data to another electronic device in the data path link. As another example, to share a social media service, the provider device 104 may transmit text data, image data, video data, or a combination thereof, to another electronic device in the data path link. As a further example, to share a gaming service, the provider device 104 may transmit text data, score data, image data, video data, or a combination thereof, to another electronic device in the data path link. The other electronic devices may be configured to operate as data sinks. For example, at least one of the devices 106-110 may be a subscriber device that is configured to operate as a data sink.

In a particular aspect, data may be transmitted between electronic devices of the data path link via one or more "data path link" channels. As used herein, a "data path link channel" is a particular wireless channel that is reserved for electronic devices in a corresponding data path link to communicate messages regarding sharing a service and to communicate data associated with the service. The messages may include traffic advertisements, service data, etc. A logical channel may correspond to a data path link channel and one or more transmission windows. For example, data may be transmitted between electronic devices of the data path link via one or more data path link channels during corresponding transmission windows. The data path link channel may also be used for sharing security information, for performing association operations, and for performing routing operations in multi-hop data path links.

In some aspects, a data path link channel and the NAN communication channel may be different wireless channels that correspond to different wireless frequency bands. In a particular aspect, the NAN communication channel may be a 2.4 gigahertz (GHz) channel, and the data path link channel may be a 5 GHz channel. In other aspects, the data path link channel and the NAN communication channel may be the same wireless channel. For example, the devices 104-110 may share data associated with the data path link via the NAN communication channel. In some aspects, the first NAN may include multiple data path links. A first data path link of the multiple data path links may correspond to a first data path link channel. A second data path link of the multiple data path links may correspond to a second data path link channel. The first data path link channel may be distinct from the second data path link channel. In an alternate aspect, the first data path link channel may be the same as the second data path link channel. In yet another aspect, the first data path link channel may overlap the second data path link channel. The multiple data path links may correspond to different services provided by various electronic devices in the first NAN. In some aspects, electronic devices of the multiple data path links may share data via the same data path link channel during distinct transmission windows.

During operation, one of the electronic devices of the first NAN may generate and transmit a synchronization (sync) beacon in accordance with a NAN standard or protocol. For example, the second device 108 may transmit the synchronization beacon via the NAN communication channel. Electronic device(s) within a one-hop range of the second device 108 may retransmit the synchronization beacon so that the synchronization beacon propagates throughout the first NAN. The devices 104, 106, and 110 may receive the synchronization beacon and may perform synchronization operations based on the synchronization beacon. For example, the devices 104, 106, and 110 may synchronize timing circuitry based on receiving the synchronization beacon. The timing circuitry may include an internal clock.

The provider device 104 may, after performing the synchronization operations, begin providing a particular service to other devices of the first NAN, as described herein. The provider device 104 may determine a first plurality of logical channels. For example, the provider device 104 may determine the first plurality of logical channels based on default data, based on input of a user of the provider device 104, or both. The first plurality of logical channels may correspond to a plurality of physical communication channels and one or more associated transmission windows. The plurality of physical communication channels may include a 2.4 Gigahertz (GHz) wireless communication channel, a 5 GHz wireless communication channel, or both.

In a particular aspect, a single logical channel corresponds to a plurality of physical communication channel. For example, the logical channel may correspond to a first physical communication channel during one or more first time windows and may correspond to a second physical communication channel during one or more second time windows. The first time windows and the second time windows may be distinct, overlapping, or the same. In a particular aspect, the logical channel corresponds to a channel hopping sequence. The channel hopping sequence may indicate that the logical channel corresponds to the first physical communication channel during the first time windows and corresponds to the second physical communication channel during the second time windows. The provider device 104 may determine available logical channels. For example, the available logical channels may be a subset of the first plurality of logical channels that are not being used by the provider device 104, e.g., to participate in other data path links.

The provider device 104 may generate a message indicating that the provider device 104 is available to provide the particular service via one or more available logical channels. The message may include or correspond to a service advertisement. In a particular aspect, the provider device 104 may provide the particular service via a "basic" channel. The basic channel may correspond to a transmission window of the NAN channel that follows a NAN discovery window. In a particular aspect, the service advertisement may not indicate the basic channel. Thus, the devices 106-110 may assume that the provider device 104 is available to provide the particular service via the basic channel in response to receiving the service advertisement regardless of whether the service advertisement indicates the basic channel.

The provider device 104 may send the service advertisement to the devices 106-110 of the first NAN during a NAN discovery window. The devices 104-110 may monitor the NAN channel during the NAN discovery window. One or more of the devices 106-110 may receive the service advertisement during the NAN discovery window. The one or more devices may send a subscribe message in response to receiving the service advertisement. The provider device 104 may determine that the one or more devices are available to receive the particular service based on receiving the subscribe message. For example, the provider device 104 may, in response to receiving a subscribe message from a particular device, determine that the particular device is available to communicate via at least one of the available logical channels, the basic channel, or a combination thereof.

In a particular aspect, the provider device 104 may receive subscribe messages from multiple subscriber devices. For example, the provider device 104 may receive a subscribe message from each of the devices 106-110. A data path link corresponding to the available logical channels, the basic channel, or a combination thereof, may include the provider device 104 and each subscriber device from which the provider device 104 received a subscribe message responsive to the service advertisement. A data link identifier may correspond to (e.g., indicate) the data path link. In a particular aspect, the provider device 104 may generate the data link identifier and may provide the data link identifier to each subscriber device (e.g., the devices 106-110) from which the provider device 104 received a subscribe message.

A NDL-group address may correspond to the data path link. The NDL-group address may be the same as or distinct from the data link identifier. The data link identifier may identify the data path link and the NDL-group address may be used as a destination address to send messages to devices of the data path link. As used herein, a "data link group address" may refer to the NDL-group address. In a particular aspect, a NDL data session (e.g., a unicast session or a multicast session) may correspond to a session identifier that identifies the NDL data session. A particular device (e.g., the device 104-110) may determine the session identifier. For example, the provider device 104 may generate the session identifier. In a particular aspect, multiple devices (e.g., the devices 104-110) may determine the session identifier based on exchanging negotiation messages during data link setup. In a particular aspect, the NDL-group address may be based at least in part on the session identifier. For example, the NDL-group address may be based on the session identifier and an identifier (e.g., a MAC address) of a device. To illustrate, the provider device 104 may determine the NDL-group address based on the session identifier and an identifier (e.g., a MAC address) of the provider device 104. The provider device 104 may provide the NDL-group address to one or more devices (e.g., the first device 106, the second device 108, the third device 110, or a combination thereof) of the data path link. In a particular aspect, the provider device 104 may provide the NDL-group address to each subscriber device (e.g., the devices 106-110) from which the provider device 104 received a subscribe message. In a particular aspect, the data path link may include one or more additional devices operating as provider devices of the particular service. The provider device 104 may provide the NDL-group address to the additional devices. The NDL-group address may persist as long as the NDL data session persists.

The provider device 104 may perform data link setup by exchanging negotiation messages with each subscriber device (e.g., the devices 106-110) from which the provider device 104 received a subscribe message. For example, the provider device 104 may send a negotiation message to a subscriber device indicating an identifier (e.g., an AID) corresponding to the subscriber device. The identifier may uniquely identify the subscriber device relative to other subscriber devices participating in the data path link.

The provider device 104 may determine a multicast identifier corresponding to multiple subscriber devices of the data path link. The multiple subscriber devices may include at least two of the devices 106-110. For example, the provider device 104 may determine a first multicast identifier corresponding to the first device 106 and the second device 108, a second multicast identifier corresponding to the first device 106 and the third device 110, a third multicast identifier corresponding to the first device 106 and the second device 108, a fourth multicast identifier corresponding to devices 106-110, or a combination thereof. The provider device 104 may provide the multicast identifier to each of the multiple subscriber devices. For example, the provider device 104 may send the first multicast identifier to the first device 106 and to the second device 108, the second multicast identifier to the first device 106 and to the third device 110, the third multicast identifier to the first device 106 and to the second device 108, the fourth multicast identifier to each of the devices 106-110, or a combination thereof.

A particular multicast identifier may be used by the provider device 104 to indicate availability of data to be sent to the corresponding subscriber devices, to send multicast data to the corresponding subscriber devices, or both. For example, the provider device 104 may send a traffic advertisement indicating the first multicast identifier to indicate availability of data (e.g., multicast data) to be sent to the first device 106 and the second device 108. The provider device 104 may generate a multicast message having a destination field that indicates the first multicast identifier. The multicast message may include first data. The provider device 104 may provide the multicast message, via a multicast transmission, to the first device 106 and to the second device 108. As another example, the provider device 104 may send a second traffic advertisement indicating the second multicast identifier to indicate availability of data (e.g., multicast data) to be sent to the first device 106 and the third device 110. The provider device 104 may generate a second multicast message having a destination field that indicates the second multicast identifier. The second multicast message may include second data. The provider device 104 may provide the second multicast message, via a multicast transmission, to the first device 106 and to the third device 110.

In a particular aspect, the same traffic advertisement may include multiple multicast identifiers. For example, a traffic advertisement may include the first multicast identifier and the second multicast identifier when the provider device 104 has first multicast data to send to the first device 106 and the second device 108 and has second multicast data to send to the first device 106 and the third device 110.

A data path link may be associated with one or more communication channels corresponding to the available logical channels, the basic channel, or a combination thereof. The data path link may use a communication schedule including one or more transmission windows associated with the available logical channels, the basic channel, or a combination thereof. For example, the data path link may communicate via the NAN communication channel during a transmission window of the basic channel. As another example, the data path link may communicate via a communication channel during one or more transmission windows associated with a logical channel.

Electronic devices participating in a data path link may monitor one or more communication channels during a beginning portion of at least some transmission windows associated with the data path link. The beginning portion may correspond to a paging window. For example, the provider device 104 and the devices 106-110 may monitor the NAN communication channel during a paging window that begins when a NAN discovery window ends. As another example, the provider device 104 and the devices 106-110 may monitor a particular communication channel corresponding to an available logical channel during a paging window of one or more corresponding transmission windows.

In a particular aspect, devices participating in a data path link may monitor a corresponding communication channel during at least a first number of paging windows of one or more corresponding transmission windows. For example, a first logical channel of the available logical channels may correspond to a first communication channel and one or more transmission windows. In a particular aspect, the first communication channel may correspond to an Institute of Electrical and Electronics Engineers (IEEE) channel 1 or an IEEE channel 11 in a 2.4 Gigahertz (GHz) frequency band.

As illustrated in FIG. 1, a paging window 132 associated with a particular logical channel of a data path link may begin at a first time 124 and may end at a second time 126. A first transmission window may include the paging window 132 and a first data transmission window 148. The first data transmission window 148 may begin at the second time 126 and may end at a fourth time 130. The first data transmission window 148 may include a trigger slot 134 (e.g., a trigger window). The trigger slot 134 may begin at the second time 126 and may end at a third time 118. In a particular aspect, the trigger slot 134 may correspond to a trigger window between the paging window 132 and a data transmission window. The data transmission window may begin at the third time 118 and may end at the fourth time 130.

Each of the devices 104-110 may have at least two operating modes. For example, a first operating mode may correspond to an active operating mode. While operating in the active mode, a particular device monitors the first communication channel. Each of the devices 104-110 may be expected to operate in the active mode during at least a portion of the paging window 132. As another example, a second operating mode of the device 104-110 may correspond to a low-power operating mode. While operating in the second operating mode, a particular device refrains from monitoring the first communication channel, monitors a second communication channel that is distinct from the first communication channel, performs actions related to another network, or a combination thereof. A particular device of the devices 104-110 may transition to the second operating mode during a remaining portion of a window (e.g., the first transmission window, the paging window 132, or the first data transmission window 148). For example, the particular device may determine an idle time of the window (e.g., the first transmission window, the paging window 132, or the first data transmission window 148) during which no traffic is detected on the first communication channel. The particular device may, in response to determining that the idle time satisfies a threshold, transition to the second operating mode during a remaining portion of the window (e.g., the first transmission window, the paging window 132, or the first data transmission window 148).

The provider device 104 may generate a traffic advertisement 128 in response to determining that data is available to be sent by the provider device 104 to one or more subscriber devices (e.g., the devices 106-110). The provider device 104 may determine that the data is available to be sent to the subscriber devices in response to determining that the data is in one or more buffers at the provider device 104. The traffic advertisement 128 may indicate (or identify) devices for which the provider device 104 has data. For example, the traffic advertisement 128 may indicate the first device 106 and the second device 108 as data recipients if the provider device 104 has data for the first device 106 and has data for the second device 108. To illustrate, the provider device 104 may, during data link setup, provide a first identifier (e.g., 1) to the first device 106, a second identifier (e.g., 2) to the second device 108, and a third identifier (e.g., 3) to the third device 110. The traffic advertisement 128 may include (or indicate) the first identifier and the second identifier to indicate the first device 106 and the second device 108 as data recipients. For example, the traffic advertisement 128 may include a bitmap. A bit of the bitmap may correspond to a particular identifier. For example, a first bit of the bitmap may correspond to the first identifier, a second bit of the bitmap may correspond to the second identifier, a third bit of the bitmap may correspond to the third identifier, and so on.

A first value (e.g., 1) of a bit of the bitmap may indicate that a corresponding subscriber device is a data recipient. For example, the first bit and the second bit of the bitmap may have the first value (e.g., 1) to indicate the first device 106 and the second device 108 as data recipients. A second value (e.g., 0) of a bit of the bitmap may indicate that a corresponding subscriber device is not a data recipient. For example, the third bit of the bitmap may have the second value (e.g., 0) to indicate that the third device 110 is not a data recipient. To illustrate, the second value of the third bit may indicate that the provider device 104 does not have data to send to the third device 110 during the first data transmission window 148.

In a particular aspect, the provider device 104 may transition to the second operating mode during at least a portion of the first transmission window in response to determining that the provider device 104 does not have data to send. In a particular aspect, the first device 106 may transition to the second operating mode during at least a portion of the first data transmission window 148 in response to determining that no traffic advertisements indicating that data is available to be sent to the first device 106 have been received during the paging window 132. In a particular aspect, a particular device of the devices 104-110 may determine an idle time in a particular window (e.g., the first transmission window, the paging window 132, or a portion of the first data transmission window 148) during which no traffic is detected on a communication channel (e.g., the first communication channel). The particular device (e.g., the device 104-110) may, in response to determining that the idle time satisfies a threshold, transition to the second operating mode during a remaining portion of the particular window (e.g., the first transmission window, the paging window 132, or a portion of the first data transmission window 148). For example, the first device 106 may, at a first time, determine an idle time during the paging window 132. The first device 106 may transition to the second operating mode during a remaining portion of the first transmission window in response to determining that the idle time satisfies a threshold and determining that no traffic advertisements indicating that data is available to be sent to the first device 106 have been received during the paging window 132 prior to the first time.

The provider device 104 may send the traffic advertisement 128 via the first communication channel during the paging window 132. In a particular aspect, the traffic advertisement 128 may include an announcement traffic indication message (ATIM), a public action frame, or another message. For example, the traffic advertisement 128 may be sent during an ATIM window at the beginning (e.g., the paging window 132) of the first transmission window. In a particular aspect, the traffic advertisement 128 may be included in a NAN management frame (NMF) or a NAN action frame (NAF). The NMF (or the NAF) may be similar to a SDF. For example, the NMF (or the NAF) may have a similar frame format as the SDF. To illustrate the NMF (or the NAF) may include one or more fields that are included in the SDF. Alternatively, or in addition, the NMF (or the NAF) may include one or more fields that are not included in the SDF. A particular frame having the same format may be referred to as an SDF when the particular frame is used during service discovery operation and may be referred to as an NMF (or an NAF) when used during traffic advertisement operation, ranging operation, or another operation. The NMF (or the NAF) may include a type field indicating whether the NMF (or the NAF) corresponds to a traffic advertisement operation, a ranging operation, or another operation.

The traffic advertisement 128 may be a unicast message, a multicast message, or a broadcast message. For example, when the traffic advertisement 128 is a unicast message, the traffic advertisement 128 may include a destination field that indicates the first device 106. In a particular aspect, the traffic advertisement 128 may be an ATIM and a destination field of the ATIM may include an identifier of the particular service.

In a particular aspect, the provider device 104 may determine that a count of a set of devices (e.g., the first device 106, the second device 108, the third device 110, or a combination thereof) satisfies (e.g., is greater than) a threshold. The provider device 104 may, in response to determining that the count satisfies (e.g., is greater than) the threshold, generate the traffic advertisement 128 to indicate a destination address. For example, a destination field of the traffic advertisement 128 may indicate the destination address. The destination address may include a unicast address, a broadcast address (e.g., FF:FF:FF:FF:FF:FF in hexadecimal), a NDL-group address, another address, a data link identifier indicating the data path link, or another identifier.

In a particular aspect, the provider device 104 may send a first traffic advertisement (e.g., the traffic advertisement 128) including a destination address that corresponds to one of a unicast address, a broadcast address, a NDL-group address, or a data link identifier. The provider device 104 may send a second traffic advertisement (e.g., the traffic advertisement 128) including a destination address that corresponds to another of a unicast address, a broadcast address, a NDL-group address, or a data link identifier. In a particular aspect, the provider device 104 may send the first traffic advertisement during a first paging window and may send the second traffic advertisement during a second paging window. The first paging window may differ from or may be the same as second paging window. In a particular aspect, the first traffic advertisement may correspond to (e.g., indicate) a first data path link and the second traffic advertisement may correspond to (e.g., indicate) a second data path link. The first data path link may differ from or may be the same as the second data path link.

In a particular aspect, the provider device 104 may, at a first time, determine that a first number of subscriber devices (e.g., the first device 106, the second device 108, and the third device 110) are participating in the data path link. The provider device 104 may, in response to determining that the first number (e.g., 3) satisfies (e.g., is less than or equal to) a threshold (e.g., 3), generate a first traffic advertisement (e.g., the traffic advertisement 128) that includes a unicast address as a destination address. The provider device 104 may transmit the first traffic advertisement during a first paging window. Devices may enter or leave the data path link over time. The provider device 104 may determine at the second time that a second number of subscriber devices (e.g., the devices 106-110 and one or more additional devices) are participating in the data path link. The provider device 104 may, in response to determining that the second number (4) fails to satisfy (e.g., is greater than) a threshold (e.g., 3), generate a second traffic advertisement (e.g., the traffic advertisement 128) that includes a broadcast address, a NDL-group address, or a data link identifier as a destination address. The provider device 104 may transmit the second traffic advertisement during a second paging window that is subsequent to the first paging window. Traffic advertisements corresponding to the same data path link may include distinct types of destination addresses. For example, the first traffic advertisement may include a unicast address as a destination address and the second traffic advertisement may include a broadcast address, a NDL-group address, or a data link identifier as a destination address.

In a particular aspect, traffic advertisements corresponding to distinct data path links may include distinct types of destination addresses. For example, the provider device 104 may generate a first traffic advertisement (e.g., the traffic advertisement 128) including a unicast address as a destination address and may transmit the first traffic advertisement during a first paging window. The first traffic advertisement may correspond to a first data path link. For example, the first traffic advertisement may include a first data link identifier of the first data path link. The provider device 104 may generate a second traffic advertisement (e.g., the traffic advertisement 128) including a broadcast address, a NDL-group address, or a data link identifier as a destination address and may transmit the second traffic advertisement during a second paging window. The second traffic advertisement may correspond to a second data path link. For example, the second traffic advertisement may include a second data link identifier of the second data path link. The first paging window may be distinct from the second paging window. The first paging window may overlap the second paging window.

Even when the traffic advertisement 128 is a unicast message, the traffic advertisement 128 may indicate multiple subscriber devices (e.g., the first device 106, the second device 108, and the third device 110) as data recipients. For example, the traffic advertisement 128 may include a data recipient indicator 140 that indicates the multiple subscriber devices (e.g., the first device 106, the second device 108, and the third device 110). The data recipient indicator 140 may include an address list, a bit map, or both, indicating addresses (e.g., media access control (MAC) addresses) of the multiple subscriber devices. For example, the address list may include a list of the MAC addresses of the multiple subscriber devices, a list of identifiers provided by the provider device 104 to the multiple subscriber devices during data link setup, or both. As another example, a particular bit of the bit map may be associated with a particular identifier of a subscriber device. The particular identifier may correspond to a particular MAC address of the subscriber device, a particular identifier provided by the provider device 104 during data link setup to the subscriber device, or both. For example, a first bit of the bit map may be associated with a particular identifier of the first device 106, and a second bit of the bit map may be associated with a particular identifier of the third device 110. A value of each bit in the bit map may indicate whether data is available for the corresponding subscriber device. For example, a first value (e.g., 1) of the first bit may indicate that data is available for the first device 106. As another example, a second value (e.g., 0) of the second bit may indicate that no data is available for the third device 110 (e.g., the third device 110 is not included in the multiple subscriber devices).

In a particular aspect, the data recipient indicator 140 may include a multicast identifier indicating the multiple subscriber devices. For example, if the data recipient indicator 140 corresponds to an address list, the address list may include a multicast MAC address. As another example, if the data recipient indicator 140 corresponds to a bitmap, a subset of bits of the bitmap may correspond to multicast streams. For example, a particular bit of the bitmap may correspond to the multiple subscriber devices. The particular bit may have a first value (e.g., 1) to indicate availability of data to be sent to the multiple subscriber devices. To illustrate, a single bit of the bitmap may have the first value (e.g., 1) to indicate availability of data to be sent to multiple devices.

In a particular aspect, the provider device 104 may have the same data (e.g., the data 122) to multicast to the multicast subscriber devices. In another aspect, the provider device 104 may have distinct data to send to some of the multicast subscriber devices. For example, the provider device 104 may have the data 122 to send to the first device 106 and the data 142 to send to the second device 108.

In a particular aspect, the traffic advertisement 128 may indicate that the multiple subscriber devices include each of the subscriber devices associated with the data path link. For example, the provider device 104 may set a destination field of the traffic advertisement 128 to indicate the identifier of the particular service in response to determining that the data is to be sent by the provider device 104 to each of the subscriber devices associated with the data group. Thus, setting the destination field of the traffic advertisement 128 to identify the particular service may be equivalent to asserting all bits of the bit map.

The traffic advertisement 128 may be received by one or more of the devices 106-110. For example, the first device 106 may receive the traffic advertisement 128 and may forward the traffic advertisement 128 to subscriber devices (e.g., the third device 110) that are within a single-hop of the first device 106.

A subscriber device may receive the traffic advertisement 128 and may determine whether the traffic advertisement 128 indicates that the subscriber device is included in the multiple subscriber devices for which data is available. For example, the third device 110 may receive the traffic advertisement 128 and may determine that the traffic advertisement 128 indicates that the third device 110 is excluded from the multiple subscriber devices. In response, the third device 110 may transition to the second operating mode. As another example, the first device 106 may determine that the first device 106 is included in the multiple subscriber devices based on the data recipient indicator 140. To illustrate, the first device 106 may determine that the first device 106 is included in the multiple subscriber devices based on the address list including an address of the first device 106, a particular bit of the bit map corresponding to the first device 106 having a particular value (e.g., 1), the traffic advertisement 128 indicating that the first device 106 is the unicast destination of the traffic advertisement 128, the destination field of the traffic advertisement 128 indicating (e.g., including an identifier of) the particular service, or a combination thereof.

In a particular aspect, a subscriber device may be operating in a monitor (e.g., promiscuous) mode. For example, while the subscriber device is operating in the monitor mode, the subscriber device may receive the traffic advertisement 128, which may be detected by a transceiver of the subscriber device regardless of whether the traffic advertisement 128 indicates that the subscriber device is a destination of the traffic advertisement 128. To illustrate, even though the traffic advertisement 128 may be a unicast message addressed to the first device 106, a transceiver of the second device 108 may detect the traffic advertisement 128 and may process the traffic advertisement 128 to determine whether the traffic advertisement 128 indicates that data is available for the second device 108. In a particular aspect, a subscriber device may receive and process a message (e.g., the traffic advertisement 128) when the message indicates that the subscriber device is a destination of the message, when the message indicates that a source of the message is a provider device (e.g., the provider device 104) of the data path link, or both.

A subscriber device may determine whether the subscriber device is a "leader" device of the multiple subscriber devices that are indicated by the traffic advertisement 128 as being data recipients (e.g., the devices 106-110). A leader device may be a subscriber device that sends an ACK in response to receiving the traffic advertisement 128. A single subscriber device of the multiple subscriber devices (e.g., the devices 106-110) may be a leader device. For example, the first device 106 may determine whether the first device 106 is the leader device of the devices 106-110. The first device 106 may determine whether the first device 106 is included in the multiple subscriber devices. Subscriber devices that are not indicated as being a data recipient (e.g., the third device 110) may be assumed as not being a leader device.

In a particular aspect, the traffic advertisement 128 may indicate whether the first device 106 is the leader device. For example, a particular value of a particular field of the traffic advertisement 128 may indicate that the first device 106 is the leader device. The particular field may include a destination field, a leader device field, or both. The particular value may indicate at least a portion of an address of the first device 106. As another example, the data recipient indicator 140 may indicate the multiple subscriber devices in a particular device order. A position (e.g., first or last) of the first device 106 in the particular device order may indicate that the first device 106 is the leader device.

The first device 106 may determine that the first device 106 is the leader device in response to determining that the particular field of the traffic advertisement 128 has the particular value, that the first device 106 is indicated in a particular position in the particular device order in the data recipient indicator 140, or both. For example, the first device 106 may determine that the first device 106 is the leader device in response to determining that the traffic advertisement 128 includes a unicast message and that the traffic advertisement 128 (e.g., the destination field of the traffic advertisement 128) indicates that the traffic advertisement 128 is addressed to the first device 106. As another example, the second device 108 may determine that the second device 108 is not the leader device in response to determining that the traffic advertisement 128 includes a unicast message and that the traffic advertisement 128 is not addressed to the second device 108.

The second device 108 may transition to the second operating mode during a remaining portion of the paging window 132 in response to determining that the second device 108 is not the leader device. For example, the second device 108 may remain in the second operating mode until the trigger slot 134 or the first data transmission window 148.

In a particular aspect, the first device 106 may determine that the first device 106 is the leader device in response to determining that the first device 106 is included in the multiple subscriber devices for which data is available and that an acknowledgement (ACK) responsive to the traffic advertisement 128 from another subscriber device to the provider device 104 is undetected within a particular time period of receiving the traffic advertisement 128. The particular time period may be based on a default value, an address of the first device 106, a counter (e.g., a random counter or a pseudo-random counter), or a combination thereof. For example, the first device 106 may determine a position (e.g., $1^{st}$, $2^{nd}$, etc.) of the first address among the addresses of the multiple subscriber devices indicated by the data recipient indicator 140. The first device 106 may determine the duration of the particular time period by applying a particular function (e.g., multiplication, addition, or both) to the position and to a gap duration. The gap duration may have a default value (e.g., 100 milliseconds). In a particular aspect, the provider device 104 may provide the gap duration to the devices 106-110. For example, the traffic advertisement 128 may indicate the gap duration. As another example, the first device 106 may set (or reset) the pseudo-random counter at a first time in response to receiving the traffic advertisement 128. The duration may correspond to a time when the pseudo-random counter expires.

The first device 106 may refrain from sending an ACK 138 responsive to the traffic advertisement 128 based on determining that the first device 106 is not the leader device. Alternatively, the first device 106 may send the ACK 138 to the provider device 104 in response to determining that the first device 106 is the leader device. For example, the first device 106 may send the ACK 138 via the first communication channel during the paging window 132. The ACK 138 may be a media access control (MAC) frame. The ACK 138 may indicate that the first device 106 is available to receive traffic during the first data transmission window 148.

In a particular aspect, the second device 108 may detect the ACK 138 from the first device 106 to the provider device 104 during the paging window 132. The second device 108 may determine that the second device 108 is not the leader device in response to detecting the ACK 138 from the first device 106. The second device 108 may refrain from sending an ACK responsive to the traffic advertisement 128 in response to determining that the second device 108 is not the leader device. The second device 108 may conserve network resources by refraining from sending another ACK.

Alternatively, the second device 108 may determine that no ACK from another subscriber device is detected within a first duration of receiving the traffic advertisement 128. For example, the ACK 138 may be undetected by the second device 108 due to network conditions. Alternatively, the first device 106 may not have sent the ACK 138. The second device 108 may determine that the second device 108 is the leader device and may send an ACK. In this example, more than one subscriber device may determine that that subscriber device is the leader device.

In a particular aspect, the second device 108 may receive the traffic advertisement 128. The second device 108 may determine that the second device 108 is unavailable during a subsequent portion of the first transmission window. The traffic advertisement analyzer of the second device 108 may, in response to the determination, refrain from sending an ACK responsive to the traffic advertisement 128. In a particular aspect, the second device 108 may transition to the second operating mode during a remainder of the first transmission window in response to determining that the second device 108 is unavailable during the subsequent portion of the first transmission window.

In a particular aspect, a particular device of devices 104-110 may determine an idle time of a paging window (e.g., the paging window 132) during which no traffic is detected on a communication channel (e.g., the first communication channel). The particular device (e.g., the device 104-110) may, in response to determining that the idle time satisfies a threshold, transition to the second operating mode during a remaining portion of the paging window (e.g., the paging window 132). For example, the provider device 104 may, subsequent to transmission of the traffic advertisement 128, determine an idle time during which no traffic is detected on the first communication channel. The provider device 104 may, in response to determining that the idle time satisfies a threshold, transition to the second operating mode during a remaining portion of the paging window 132. As another example, the first device 106 may, subsequent to transmission of the ACK 138, determine an idle time during which no traffic is detected on the first communication channel. The first device 106 may, in response to determining that the idle time satisfies a threshold, transition to the second operating mode during a remaining portion of the paging window 132.

In a particular aspect, the first device 106 may, subsequent to receiving the traffic advertisement 128, determine an idle time of the paging window 132 during which no traffic is detected on the first communication channel. The first device 106 may, in response to determining that the idle time satisfies a threshold, send a data trigger (e.g., a data request 150 or a trigger frame) to the provider device 104. In this aspect, the first device 106 may send the data trigger (e.g., the data request 150 or the trigger frame) prior to the first data transmission window 148 in response to detecting inactivity during the paging window 132.

The provider device 104 may receive the ACK 138 from the first device 106 during the paging window 132. Receipt of the ACK 138 from the first device 106 may indicate to the provider device 104 that the traffic advertisement 128 was successfully transmitted to at least one device of the data path link. Thus, the provider device 104 does not need to receive an ACK from each device for which it has data. Since a single ACK is sufficient, a size (e.g., a default size) of the paging window 132 may be smaller compared to a paging window that is sized to accommodate ACKs from all of the multiple subscriber devices. The subscriber devices 104-110 of the data path link may conserve network resources by monitoring the first communication channel during the shorter paging window, as compared to a longer paging window.

The provider device 104 may remain in an active operating mode in response to determining that the ACK 138 has been received during the paging window 132. Alternatively, the provider device 104 may, in response to receiving the ACK 138, transition to the second operating mode until detecting the trigger slot 134 or the first data transmission window 148. For example, the provider device 104 may, in response to receiving the ACK 138, transition to the second operating mode during the remainder of the paging window 132. The provider device 104 may transition to the first operating mode at a beginning of the trigger slot 134 or a beginning of the first data transmission window 148. The provider device 104 may thus conserve network resources or perform other operations by transitioning to the second operating mode in response to receiving a single ACK.

In a particular aspect, the provider device 104 may send a second traffic advertisement during the paging window 132 in response to determining that no ACK responsive to the traffic advertisement 128 has been received. For example, the provider device 104 may send the traffic advertisement 128 at a first time. The provider device 104 may determine that no ACK responsive to the traffic advertisement 128 has been received prior to a second time. The provider device 104 may send a second traffic advertisement in response to the determination. The second time may correspond to a sum of the first time and an ACK duration. The ACK duration may be a default value. In a particular aspect, the ACK duration may be specified by an IEEE 802.11 standard.

The traffic advertisement 128 and the second traffic advertisement may be unicast messages addressed to the same device or to distinct devices. For example, the traffic advertisement 128 may be addressed to the first device 106. The provider device 104 may address the second traffic advertisement to a device other than the first device 106 in response to determining that no ACK responsive to the traffic advertisement 128 has received from the first device 106 prior to the second time. For example, the second traffic advertisement may be addressed to the second device 108 for which data is available.

In a particular aspect, the provider device 104 may send no more than a particular number of traffic advertisements during the paging window 132. For example, the provider device 104 may determine that a first number of traffic advertisements have been sent during the paging window 132. The provider device 104 may send the traffic advertisement 128 addressed to the first device 106 in response to determining that the first number of traffic advertisements fails to satisfy an advertising threshold. The advertising threshold may correspond to the particular number of traffic advertisements. The provider device 104 may refrain from sending the second traffic advertisement in response to determining that no ACK responsive to the traffic advertisement 128 has been received prior to the second time and that the first number of traffic advertisements satisfies the advertising threshold. In a particular aspect, the provider device 104 may transition to the second operating mode during a remaining portion of the first transmission window in response to determining that no ACK responsive to the traffic advertisement 128 has been received prior to the second time and that the first number of traffic advertisements satisfies the advertising threshold.

In a particular aspect, the traffic advertisement 128 may indicate a destination address that includes a broadcast address, a NDL-group address, or a data link identifier. In this aspect, the provider device 104 may remain in an active operating mode during the trigger slot 134 irrespective of whether an ACK responsive to the traffic advertisement 128 is received during the paging window 132. In a particular aspect, the first device 106 may, in response to determining that the destination address corresponds to the broadcast address, a NDL-group address, or the data link identifier, refrain from sending an ACK responsive to the traffic advertisement 128. In a particular aspect, the first device 106 may, in response to determining that the destination address corresponds to a unicast address of the first device 106, send the ACK 138 responsive to the traffic advertisement 128.

In a particular aspect, the traffic advertisement 128 may indicate a destination address that includes a data link identifier. In this aspect, the provider device 104 may, in response to receiving an ACK (e.g., the ACK 138) during an interval subsequent to sending the traffic advertisement 128, remain in an active operating mode during the trigger slot 134. The interval may include a short interframe space (SIFS) interval or a distributed coordination function interframe space (DIFS) interval. Alternatively, the provider device 104 may, in response to determining that no ACK responsive to the traffic advertisement 128 is received during the interval, transition to the second operating mode during the first data transmission window 148.

In a particular aspect, the first device 106 may, based on determining that the destination address corresponds to the data link identifier, send the ACK 138 responsive to the traffic advertisement 128. For example, each subscriber device (e.g., the devices 106-110) that is participating in the data path link indicated by the data link identifier may send an ACK responsive to the traffic advertisement 128. As another example, each subscriber device (e.g., the device 106-110) that is participating in the data path link indicated by the data link identifier and is indicated as a data recipient in the traffic advertisement 128 may send an ACK responsive to the traffic advertisement 128. As a further example, each subscriber device (e.g., the device 106-110) that is participating in the data path link indicated by the data link identifier and is indicated as a leader device in the traffic advertisement 128 may send an ACK responsive to the traffic advertisement 128.

A device that received the traffic advertisement 128 and determines that the traffic advertisement 128 indicates that the provider device 104 has data available for the device, may remain in the first operating mode in response to receiving the traffic advertisement 128. For example, the first device 106 may monitor the first communication channel during a subsequent window (e.g., the trigger slot 134 or the first data transmission window 148) in response to receiving the traffic advertisement 128 and determining that the traffic advertisement 128 indicates that the first device 106 is a data recipient (e.g., is included in the multiple subscriber devices). In a particular implementation, the first device 106 may transition to the second operating mode subsequent to sending the ACK 138 and may transition back to the first operating mode during the subsequent window (e.g., the trigger slot 134 or the first data transmission window 148).

In a particular aspect, the second device 108 may determine that the second device 108 is not a leader device and that the traffic advertisement 128 indicates that the second device 108 is a data recipient. The second device 108 may transition to the second operating mode in response to receiving the traffic advertisement 128 and may transition back to the first operating mode during the subsequent window (e.g., the trigger slot 134 or the first data transmission window 148), because the second device 108 is not responsible for acknowledging the traffic advertisement 128. The second device 108 may conserve network resources or may perform other actions by transitioning to the second operating mode.

In a particular aspect, a particular device of the data path link may change a channel of a transceiver of the particular device to the first communication channel to monitor the first communication channel. For example, the first device 106 may change a channel of a transceiver of the first device 106 to the first communication channel to monitor the first communication channel. In a particular aspect, the particular device may monitor the NAN communication channel during a paging window of the basic channel by continuing to monitor the NAN communication channel after an end of a NAN discovery window. For example, the first device 106 may monitor the NAN communication channel during the paging window 132 by continuing to monitor the NAN communication channel after an end of a NAN discovery window. The paging window 132 may correspond to a paging window of a basic channel. The particular device may thus avoid a wakeup penalty that may be associated with switching from refraining from monitoring a communication channel subsequent to the NAN discovery window to monitoring the communication channel during a paging window.

The provider device 104 may send data to a particular subscriber device (e.g., the device 106-108) via the first communication channel during the first data transmission window 148. For example, the provider device 104 may send the data 122 to the first device 106 and may send the data 142 to the second device 108.

In a particular aspect, the provider device 104 may send data to multiple subscriber devices during the first data transmission window 148 in response to determining that an ACK (e.g., the ACK 138) has been received from a single subscriber device of the multiple subscriber devices, that an ACK has been received from fewer than all of the multiple subscriber devices, or that an ACK has been received from each of the multiple subscriber devices during the paging window 132.

In a particular aspect, the provider device 104 may send data to one or more of the multiple subscriber devices (e.g., the devices 106-110). For example, the provider device 104 may determine that the ACK 138 has been received from the first device 106 and that no ACK has been received from the second device 108. The provider device 104 may send the data 122 to the first device 106 and the data 142 to the second device 108 based at least in part on determining that the ACK 138 has been received from the first device 106 (e.g., regardless of whether an ACK has been received from the second device 108 during the paging window 132). For example, the provider device 104 may continue to monitor the first communication channel during the first data transmission window 148 in response to receiving the ACK 138 from the first device 106 during the paging window 132. The provider device 104 may send the data 142 to the second device 108 in response to receiving a data request 152 from the second device 108 during the first data transmission window 148, as described herein. The second device 108 may receive the data 142, even though the second device 108 has not sent an ACK during the paging window 132.

In a particular aspect, the provider device 104 may send data to a particular subscriber device of the multiple subscriber devices based on availability of the particular subscriber device. The provider device 104 may determine that the particular subscriber device is available to receive the data in response to determining that an ACK (e.g., the ACK 138), a data trigger (e.g., the data request 150 or the data request 152), or both, have been received from the particular subscriber device. For example, the provider device 104 may send the data 122 to the first device 106 in response to determining that the ACK 138 has been received from the first device 106 during the paging window 132. As another example, the provider device 104 may send the data 122 to the first device 106 in response to determining that the data request 150 has been received from the first device 106, as described herein. The provider device 104 may also send the data 142 to the second device 108 in response to determining that the data request 152 has been received from the second device 108.

A device of the data path link may send a data request via the first communication channel to the provider device 104 in response to determining that the traffic advertisement 128 has been received during the paging window 132, that the device is indicated by the data recipient indicator 140 as a data recipient, and that the device is available during a remaining portion of the first transmission window. For example, the second device 108 may send the data request 152 via the first communication channel to the provider device 104 in response to determining that the traffic advertisement 128 has been received during the paging window 132, that the second device 108 is indicated by the data recipient indicator 140 as a data recipient, and that the second device 108 is available during a remaining portion of the first transmission window. The data request may indicate that the device is available to receive traffic during at least a portion of the first data transmission window 148. For example, the data request 152 may indicate that the second device 108 is available to receive traffic during at least a portion of the first data transmission window 148. The third device 110 may refrain from sending a data request via the first communication channel to the provider device 104 in response to determining that the third device 110 is unavailable during a portion of the first transmission window. A data request (e.g., the data request 150, the data request 152, or both) may include at least one of a power-save poll (PS-POLL) message, a quality of service null (QoS_NULL) frame, a public action frame, or another frame.

In a particular aspect, the first device 106 and the second device 108 may contend for a medium to transmit the data request 150 and the data request 152, respectively. The first device 106 and the second device 108 may use contention mitigation techniques in accordance with a NAN standard or protocol. For example, the first device 106 may select a random or pseudo-random start time within the trigger slot 134 or the first data transmission window 148. The first device 106 may select a random or pseudo-random back-off count. The first device 106 may use a carrier sense multiple access (CSMA) protocol based on the start time and the back-off count as a contention mitigation technique to transmit the data request 150 to the provider device 104.

In a particular aspect, the first device 106 may refrain from sending the data request 150 in response to determining that first device 106 sent the ACK 138 to the provider device 104 during the paging window 132. The second device 108 may send the data request 152 to the provider device 104 in response to determining that the second device 108 received the traffic advertisement 128 during the paging window 132, that the traffic advertisement 128 indicated that the second device 108 is a data recipient, that the second device 108 is available during a remaining portion of the first transmission window, and that an ACK responsive to the traffic advertisement 128 has not been sent from the second device 108 during the paging window 132.

The provider device 104 may send data to a device via the first communication channel during the first data transmission window 148 (e.g., an ending portion of the first data transmission window 148) in response to determining that a data request has been received from the device during the paging window 132. For example, the provider device 104 may send the data 122 via the first communication channel during the first data transmission window 148 to the first device 106 in response to determining that the data request 150 has been received from the first device 106 during the paging window 132. In a particular aspect, the provider device 104 may send data to an acknowledging subscriber device from which the provider device 104 has received an ACK responsive to the traffic advertisement 128 during the paging window 132, regardless of whether a data trigger (or data request) has been received from the acknowledging subscriber device. For example, the provider device 104 may send the data 122 to the first device 106 in response to determining that the ACK 138 has been received from the first device 106 during the paging window 132, irrespective of whether the data request 150 is received from the first device 106 by the provider device 104. The provider device 104 may send the data 142 to the second device 108 in response to receiving the data request 152 from the second device 108. The provider device 104 may refrain from sending data 122 to the third device 110 in response to determining that no data trigger (e.g. no data request 150) has been received from the third device 110 during the trigger slot 134 or the beginning portion of the first data transmission window 148.

The trigger slot 134 may occur subsequent to an end of the paging window 132 and prior to the ending portion of the first data transmission window 148. In a particular aspect, a data request (e.g., the data request 150, the data request 152, or both) may be exchanged during the trigger slot 134, during a beginning portion of the first data transmission window 148, or during the first data transmission window 148.

In a particular aspect, a trigger duration of the trigger slot 134 may be dynamically determined. For example, the provider device 104 may determine that the trigger slot 134 has ended and that an ending portion of the first data transmission window 148 has started in response to determining that expected data triggers (e.g., the data request 150, the data request 152, or both) have been received during the trigger slot 134. In a particular aspect, the expected data triggers may correspond to data triggers from each of the data recipients (e.g., the devices 106-110). In an alternate aspect, the expected data triggers may exclude a data trigger (e.g., the data request 150) from an acknowledging subscriber device (e.g., the first device 106) from which the provider device 104 received an ACK during the paging window 132.

In a particular aspect, the first device 106 may remain in the first operating mode during a remaining portion of the first transmission window in response to determining that an ACK (e.g., the ACK 138) responsive to the traffic advertisement 128 has been sent to the provider device 104 from the first device 106 during the paging window 132.

In a particular aspect, the provider device 104 may transition to the second operating mode during a remaining portion of the first transmission window in response to determining that no data triggers (e.g., the data request 150 or the data request 152) have been received during the trigger slot 134 or during the beginning portion of the first data transmission window 148.

In a particular aspect, the provider device 104 may remain in the first operating mode during a remaining portion of the first transmission window in response to determining that a data request (e.g., the data request 150 or the data request 152) has been received from at least one subscriber device (e.g., the device 106-108).

In a particular aspect, the provider device 104 may remain in the first operating mode during a remaining portion of the first transmission window in response to determining that an ACK (e.g., the ACK 138) has been received by the provider device 104 from at least one subscriber device (e.g., the first device 106) during the paging window 132 (e.g., regardless of whether the data request 150 has been received by the provider device 104).

In a particular aspect, the provider device 104 and the first device 106 may exchange data via multiple logical channels. The multiple logical channels may include one or more of the available logical channels, the basic channel, or a combination thereof. Each logical channel may correspond to a distinct data session. In a particular aspect, a first transmission window of a first logical channel of the multiple logical channels may overlap a second transmission window of a second logical channel of the multiple logical channels. In this aspect, a first transceiver of the provider device 104 and a second transceiver of the first device 106 may be communicating via multiple communication channels (e.g., a first communication channel corresponding to the first logical channel and a second communication channel corresponding to the second logical channel).

The data recipient indicator 140 may include a traffic indication map (TIM). The TIM may be a bitmap that indicates whether particular electronic devices are recipients of the data to be sent by the provider device 104. Each bit of the TIM may correspond to a different electronic device of the data path link, and a value of each bit may indicate whether or not the corresponding electronic device is a data recipient. A correspondence between the bit of the TIM and each electronic device may be based on an AID. For example, the first device 106 may associate with the provider device 104. The provider device 104 and the first device 106 may generate and exchange AIDs. To illustrate, the first device 106 may associate with the provider device 104 and may receive a first AID (e.g., 2) from the provider device 104. The devices 108 and 110 may receive distinct AIDs (e.g., 3 and 4, respectively) during association with the provider device 104. The AIDs may be used by the device 106-110 to identify corresponding bits in the TIM received from the provider device 104. For example, a second bit of the TIM may correspond to the first device 106 due to the AID of 2. In this example, a third bit and a fourth bit of the TIM may correspond to the second device 108 and the third device 110, respectively (a first bit of the TIM may be reserved).

Each of the devices 106-110 may determine whether it is a data recipient based on the corresponding bit in the TIM received from the provider device 104. For example, a determination that the devices 106-108 are data recipients may be based on the second bit and the third bit of the TIM having a logical value of one, and a determination that the third device 110 is not a recipient may be based on the fourth bit having a logical zero value.

In a particular aspect, a first power-save poll (PS-POLL) message may operate as the data request 150 (or the data request 152). For example, the first device 106 may generate the first PS-POLL message in a similar manner to generation of a PS-POLL message in a traditional access point (AP) based wireless network. However, the first device 106 may generate the first PS-POLL message as a broadcast message, as compared to a unicast PS-POLL message in the traditional AP based wireless network. In a particular aspect, the first PS-POLL message may operate as a data trigger for multiple devices. For example, multiple electronic devices may receive the first PS-POLL message and may send data to the first device 106 in response to receiving the first PS-POLL message.

In a particular aspect, the first device 106 may set a portion (e.g., a third octet and a fourth octet) of the first PS-POLL message to a particular value (e.g., "0"s). The first device 106 may transmit the first PS-POLL message via the first communication channel during the trigger slot 134, during a beginning portion of the first data transmission window 148, or during the first data transmission window 148.

The provider device 104 may receive the first PS-POLL message during the trigger slot 134, during the beginning portion of the first data transmission window 148, or during the first data transmission window 148. In response to receiving the first PS-POLL message, the provider device 104 may transmit the data 122 to the first device 106 via the first communication channel during the first data transmission window 148. For example, the provider device 104 may transmit the data 122 to the first device 106 during the trigger slot 134, a beginning portion of the first data transmission window 148, or an ending portion of the first data transmission window 148.

In a particular aspect, a quality of service null (QoS_NULL) frame may operate as the data request 150 (or the data request 152). For example, the first device 106 may generate the QoS_NULL frame. The QoS_NULL frame may indicate a reverse direction grant (RDG) from the provider device 104. For example, value(s) of one or more bits in the QoS_NULL frame may indicate the RDG. The RDG may be similar to a RDG in a physical protocol data unit (PPDU), in accordance with one or more wireless standards or protocols, but may be included in the QoS_NULL frame instead of the PPDU. The RDG may authorize a recipient of the QoS_NULL frame to use a transmit opportunity (tx_op) of a sender of the QoS_NULL frame to transmit data during a tx_op of the sender. For example, the first device 106 may generate a QoS_NULL frame that indicates a RDG and may transmit the QoS_NULL frame to the provider device 104 via the first communication channel during the trigger slot 134, during the beginning portion of the first data transmission window 148, or during the first data transmission window 148. The QoS_NULL frame with the RDG may authorize the provider device 104 to send a frame of the data 122 to the first device 106 during a tx_op of the first device 106.

The provider device 104 may, in response to receiving the QoS_NULL frame, transmit a frame of the data 122 to the first device 106 via the first communication channel during the tx_op of the first device 106. In this manner, the provider device 104 may not have to contend for the first communication channel to transmit the frame of the data 122. When the data 122 is a single frame, an entirety of the data 122 may be transmitted from the provider device 104 to the first device 106 in response to the QoS_NULL frame. When the data 122 includes more than one frame, the provider device 104 may indicate, via one or more bits in the frame of the data 122, that additional frames of the data 122 are to be transmitted. For example, the provider device 104 may indicate that additional frames of the data 122 are to be transmitted via a more bit or an end-of-service-period (EOSP) bit.

In a particular aspect, the provider device 104 may determine that the provider device 104 has no more data to send to the first device 106 (or the second device 108) during the first data transmission window 148. The provider device 104 may, in response to the determination, send an end of data indicator 190 indicating that the provider device 104 has no more data to send to the first device 106 (or the second device 108). For example, the end of data indicator 190 may correspond to a particular bit (e.g., a more bit or an EOSP bit) of a frame of the data 122. The particular bit may have a first value (e.g., 0) to indicate that the provider device 104 has no more data to send to the first device 106 during the first data transmission window 148. The particular bit may have a second value (e.g., 1) to indicate that the provider device 104 has more data to send to the first device 106 during the first data transmission window 148.

In a particular aspect, the provider device 104 may determine that the provider device 104 has no data to send to any device of the multiple devices (e.g., the devices 106-110) during a remaining portion of the first data transmission window 148. For example, the provider device 104 may, subsequent to sending the data 142, determine that the provider device 104 has no more data to send to the devices 106-110. In response to the determination, the provider device 104 may transition to the second operating mode during a remaining portion of the first data transmission window 148.

In response to receiving the frame of the data 122 with an indication that more data is (e.g., additional frames of the data 122 are) to be transmitted, the first device 106 may contend for the first communication channel and, upon successful contention, the first device 106 may transmit another QoS_NULL frame with a RDG to the provider device 104 to cause the provider device 104 to transmit more data (e.g., another frame of the data 122). This process may be repeated until the provider device 104 has sent an entirety of the data (e.g., the data 122) to be sent to the first device 106 or until a termination of the first data transmission window 148.

In some aspects, the first device 106 may be indicated as a recipient of data from multiple other electronic devices. In these aspects, the first device 106 may transmit a QoS_NULL frame with a RDG to the multiple electronic devices and may receive data responsive to the QoS_NULL frames from each of the multiple electronic devices. When the first device 106 has received a data frame in response to each QoS_NULL frame, and when the data frame does not indicate that more data is to be transmitted, the first device 106 may transition to the second operating mode for a remainder of the first data transmission window 148. For example, in response to receiving the end of data indicator 190, the first device 106 may transition to the second operating mode during a remaining portion of the first data transmission window 148. For example, the first device 106 may determine that the data frame from each provider device of the multiple electronic devices indicates that the provider device has no more data to send to the first device 106 during the first transmission window 148. In response to the determination, the first device 106 may transition to the second operating mode during a remaining portion of the first transmission window 148. When at least one data frame indicates that more data is to be transmitted to the first device 106, the first device 106 may remain in the first operating mode and may continue to transmit QoS_NULL frames with RDGs.

In some aspects, the provider device 104 may have data to send to multiple recipients. In these aspects, the provider device 104 may transmit a QoS_NULL frame with a RDG to the multiple electronic devices and may receive data triggers (e.g., the data request 150, the data request 152, or both) responsive to the QoS_NULL frames from each of the multiple electronic devices. When the provider device 104 has received a data trigger in response to each QoS_NULL frame, the provider device 104 may transition to the second operating mode for a remainder of the trigger slot 134 or a remainder of the beginning portion of the first data transmission window 148.

In a particular aspect, the provider device 104 may set a value of a particular field (e.g., a duration field) of a first frame to indicate a network allocation vector (NAV) interval that is greater than a threshold. The provider device 104 may send the first frame during the paging window 132. The first frame may include the traffic advertisement 128. In an alternate implementation, the first frame may include a request to send (RTS) frame. In this implementation, the provider device 104 may send the first frame prior to sending the traffic advertisement 128.

A subscriber device (e.g., the first device 106, the second device 108, the third device 110, or a combination thereof) may send an ACK (e.g., the ACK 138) responsive to the traffic advertisement 128. The provider device 104 may, in response to receiving an ACK (e.g., the ACK 138) during an interval subsequent to sending the traffic advertisement 128, send a contention free end (CF-end) frame during the paging window 132.

In a particular aspect, the first device 106 may operate as a provider (or forwarder) of the particular service. For example, the first device 106 may forward the traffic advertisement 128 to electronic devices of the first NAN that are within a single hop count of the first device 106. To illustrate, the first device 106 may send the traffic advertisement 128 to a subscriber device. The subscriber device may send an ACK to the first device 106 in response to the traffic advertisement 128. The subscriber device may send a data trigger (e.g., a data request) to the first device 106. The first device 106 may send data (e.g., the data 122) to the subscriber device. The subscriber device may thus receive data associated with the particular service provided by the provider device 104 even though the provider device 104 is not within a single hop of the subscriber device.

The system corresponding to the diagram 100 may thus conserve resources of the device 104-110 of the first NAN. For example, the first device 106 may transition to the second operating mode during a portion of a transmission window based on a determination that no traffic advertisement indicating the first device 106 as a data recipient has been received during a paging window. As another example, the provider device 104 may transition to the second operating mode in response to determining that no ACK responsive to the traffic advertisement has been received during the paging window. As a further example, the provider device 104 may transition to the second operating mode during a portion of the paging window in response to receiving a single ACK responsive to the traffic advertisement. Thus, the provider device 104, the first device 106, or both may conserve power or may perform other operations while in the second operating mode, as compared to substantially continuously monitoring the communication channel for data transmissions.

FIGS. 1-11 illustrate various aspects and operations of a system that includes a first NAN. The aspects and operations shown in FIG. 1-11 are for illustration and are not limiting. In other aspects, one or more portions of the aspects and operations shown in FIGS. 1-11 may be combined.

Figure 2:
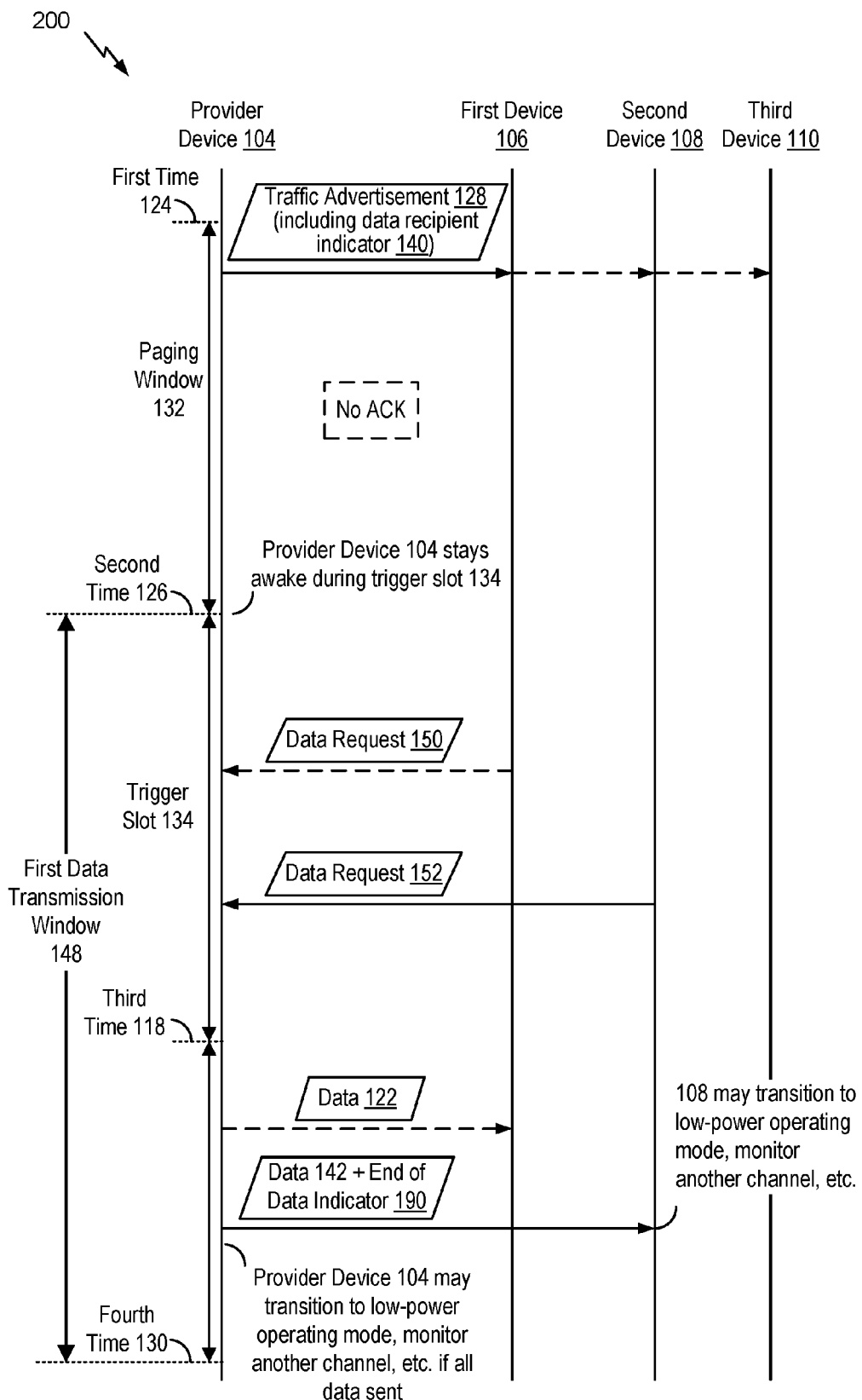
FIG. 2 is another illustrative ladder diagram corresponding to operation of the system of FIG. 1.

Referring to FIG. 2, a diagram is shown and generally designated diagram 200. In a particular aspect, the diagram 200 may correspond to operation of a particular aspect of the system described with reference to FIG. 1. The timing and operations shown in FIG. 2 are for illustration and are not limiting. In other aspects, additional or fewer operations may be performed and the timing may be different.

The diagram 200 may differ from the diagram 100 of FIG. 1 in that the provider device 104 may determine that no ACK responsive to the traffic advertisement 128 has been received during the paging window 132. The traffic advertisement 128 may include a unicast message that is addressed to the first device 106. In a particular aspect, the provider device 104 may address the traffic advertisement 128 to the first device 106 based on a position (e.g., first or last) of the first device 106 in a device order indicated by the data recipient indicator 140 (e.g., a TIM). In an alternate aspect, the provider device 104 may address the traffic advertisement 128 to the first device 106 based on transmission reliability of past data associated with the first device 106. For example, the transmission reliability may be determined based on a ratio of a first number of ACKs received from the first device 106 relative to a second number of traffic advertisements sent to the first device 106 over a particular duration (e.g., one day, one week, one month, etc.). In a particular aspect, the provider device 104 may address the traffic advertisement 128 to the first device 106 based on a received signal strength indication (RSSI). For example, the provider device 104 may address the traffic advertisement 128 to the first device 106 in response to determining that an RSSI associated with the first device 106 satisfies a threshold.

The first device 106 may receive the traffic advertisement 128. The first device 106 may refrain from sending the ACK 138 in response to determining that the first device 106 is expected to be unavailable to receive traffic during at least a portion of the first data transmission window 148. For example, the first device 106 may determine that the first device 106 is expected to be unavailable in response to determining that the first device 106 is scheduled to transition to the second operating mode, as described with reference to FIG. 1, during at least a portion of the data transmission window 148. Alternatively, the first device 106 may send the ACK 138 in response to determining that the first device 106 is a leader device, as described with reference to FIG. 1. For example, the first device 106 may send the ACK 138 to the provider device 104 in response to determining that the traffic advertisement 128 is addressed to the first device 106. In a particular aspect, the first device 106 may send the ACK 138 to the provider device 104 within a particular duration (e.g., a SIFS interval) of receiving the traffic advertisement 128.

The second device 108 may be operating in a monitor mode (e.g., a promiscuous mode) and may receive the traffic advertisement 128 that is addressed to the first device 106. The second device 108 may refrain from sending an ACK responsive to the traffic advertisement 128 to the provider device 104. For example, the second device 108 may refrain from sending the ACK to the provider device 104 in response to determining that the traffic advertisement 128 includes a unicast message that is addressed to the first device 106.

In a particular aspect, the provider device 104 may send a second traffic advertisement in response to determining that no ACK responsive to the traffic advertisement 128 has been received during a particular interval (e.g., a SIFS interval) subsequent to sending the traffic advertisement 128. The second traffic advertisement may include a unicast message that is addressed to the first device 106 or to another device (e.g., the second device 108). In a particular aspect, the provider device 104 may send the second traffic advertisement in response to determining that a first number of traffic advertisements sent during the paging window 132 fails to satisfy (e.g., is less than) an advertising threshold, as described with reference to FIG. 1. For example, the provider device 104 may send no more than a particular number of traffic advertisements. The advertising threshold may correspond to the particular number of traffic advertisements. The advertising threshold may be lower than a number of devices (e.g., 2) indicated by the data recipient indicator 140.

The provider device 104 may determine that no ACK responsive to the traffic advertisement 128 has been received from the first device 106 during the paging window 132. The provider device 104 may not receive any ACKs responsive to the traffic advertisement 128 for various reasons. For example, the first device 106 may not receive the traffic advertisement 128 due to network collision and may not send the ACK 138 to the provider device 104. As another example, the first device 106 may receive the traffic advertisement 128 and may not send the ACK 138 to the provider device 104 in response to determining that the first device 106 is unavailable to receive traffic during at least a portion of the first data transmission window 148. As a further example, the first device 106 may send the ACK 138 in response to receiving the traffic advertisement 128 and the provider device 104 may not receive the ACK 138 during the paging window 132 due to network collision.

The provider device 104 may monitor a first communication channel during a beginning portion of the first data transmission window 148 (or the trigger slot 134) irrespective of receiving an ACK during the paging window 132. A subscriber device may send a data request to the provider device during the beginning portion (or the trigger slot 134) in response determining that the device is available to receive traffic during at least a portion of the first data transmission window 148. For example, the first device 106 may send the data request 150 to the provider device 104 in response determining that the first device 106 is available to receive traffic during at least a portion of the first data transmission window 148 (or the ending portion of the first data transmission window 148). The first device 106 may send the data request 150 to the provider device 104 during the beginning portion (or the trigger slot 134).

The first device 106 may send the data request 150 to the provider device 104 in response to determining that the traffic advertisement 128 was addressed to the first device 106, that an ACK responsive to the traffic advertisement 128 has not previously been sent from the first device 106 to the provider device 104 during the paging window 132, that the data recipient indicator 140 indicates the first device 106, that the traffic advertisement 128 is received from a device (e.g., the provider device 104) that is associated with the first device 106, or a combination thereof. In a particular aspect, the first device 106 may determine that the provider device 104 is associated with the first device 106 in response to determining that the first device 106 and the provider device 104 have exchanged AIDs, as described with reference to FIG. 1. The second device 108 may send the data request 152 to the provider device 104 in response to determining that the data recipient indicator 140 indicates the second device 108, the traffic advertisement 128 is received from a device (e.g., the provider device 104) that is associated with the second device 108, or both.

The provider device 104 may send data to a subscriber device in response to receiving a data request from the subscriber device during the beginning portion (or the trigger slot 134). For example, the provider device 104 may send the data 122 to the first device 106 in response to receiving the data request 150 from the first device 106 during the beginning portion (or the trigger slot 134). The first device 106 may receive the data 122 from the provider device 104 irrespective of the provider device 104 receiving an ACK responsive to the traffic advertisement 128 during the paging window 132.

The provider device 104 may increase a likelihood that data is sent to a subscriber device by monitoring a first communication channel during a trigger window irrespective of receiving an ACK during a paging window. For example, a subscriber device that received the traffic advertisement may send a data request during the trigger window. The provider device 104 may send data to the subscriber device during a data transmission window that is subsequent to the paging window.

Figure 3:
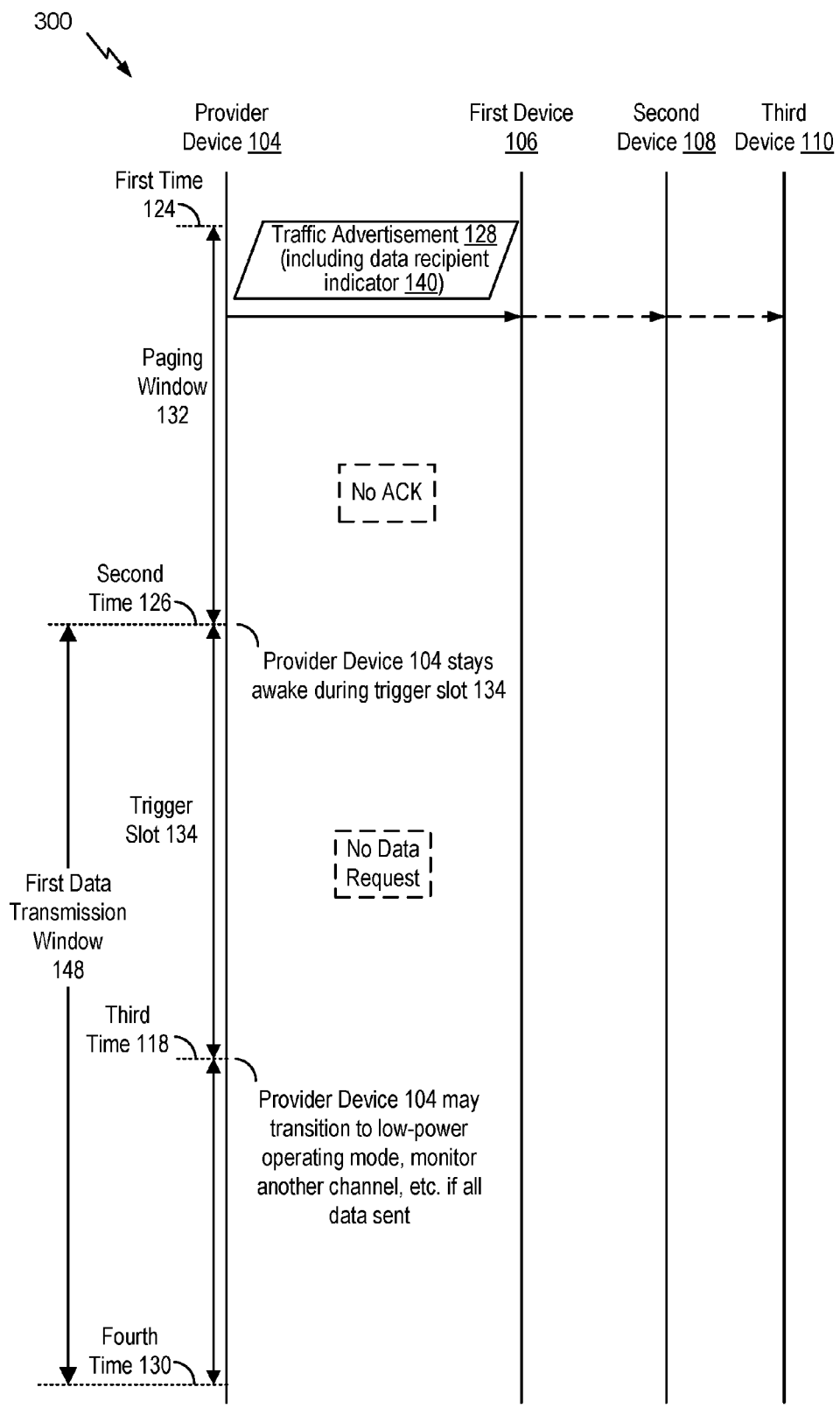
FIG. 3 is another illustrative ladder diagram corresponding to operation of the system of FIG. 1.

Referring to FIG. 3, a diagram is shown and generally designated diagram 300. In a particular aspect, the diagram 300 may correspond to operation of a particular aspect of the system described with reference to FIG. 1. The timing and operations shown in FIG. 3 are for illustration and are not limiting. In other aspects, additional or fewer operations may be performed and the timing may be different.

The diagram 300 may differ from the diagram 200 of FIG. 2 in that the provider device 104 may determine that no data request has been received from devices (e.g., the first device 106 and the second device 108) indicated by the data recipient indicator 140 during a beginning portion of the first data transmission window 148 (or the trigger slot 134). The provider device 104 may not receive any data requests due to various reasons. For example, a subscriber device may not have received the traffic advertisement 128 and may not have sent a data request responsive to the traffic advertisement 128. To illustrate, the first device 106 may not have received the traffic advertisement 128 and may not have sent the data request 150. As another example, a subscriber device may have received the traffic advertisement 128 and may not have sent a data request in response to determining that the subscriber device is expected to be unavailable to receive traffic during at least a portion of the first data transmission window 148 (or the ending portion of the first data transmission window 148), as described with reference to FIG. 2. To illustrate, the first device 106 may have received the traffic advertisement 128 and may not have sent the data request 150 in response to determining that the first device 106 is expected to be unavailable to receive traffic during at least a portion of the first data transmission window 148 (or the ending portion of the first data transmission window 148). As a further example, a subscriber device may have sent a data request to the provider device 104 and the provider device 104 may not have received the data request due to network collision. To illustrate, the first device 106 may have sent the data request 150 to the provider device 104 and the provider device 104 may not have received the data request 150 due to network collision.

The provider device 104 may transition to the second operating mode, described with reference to FIG. 1, in response to determining that no ACK is received from the first device 106 during the paging window 132 and that no data request is received from the first device 106 and the second device 108 during the beginning portion of the first data transmission window 148 (or the trigger slot 134). The provider device 104 may transition to the second operating mode during a remaining portion of the first data transmission window 148.

The provider device 104 may thus conserve resources or perform other actions by transitioning to the second operating mode when subscriber devices are unavailable to receive traffic or are experiencing network collisions.

Figure 4:
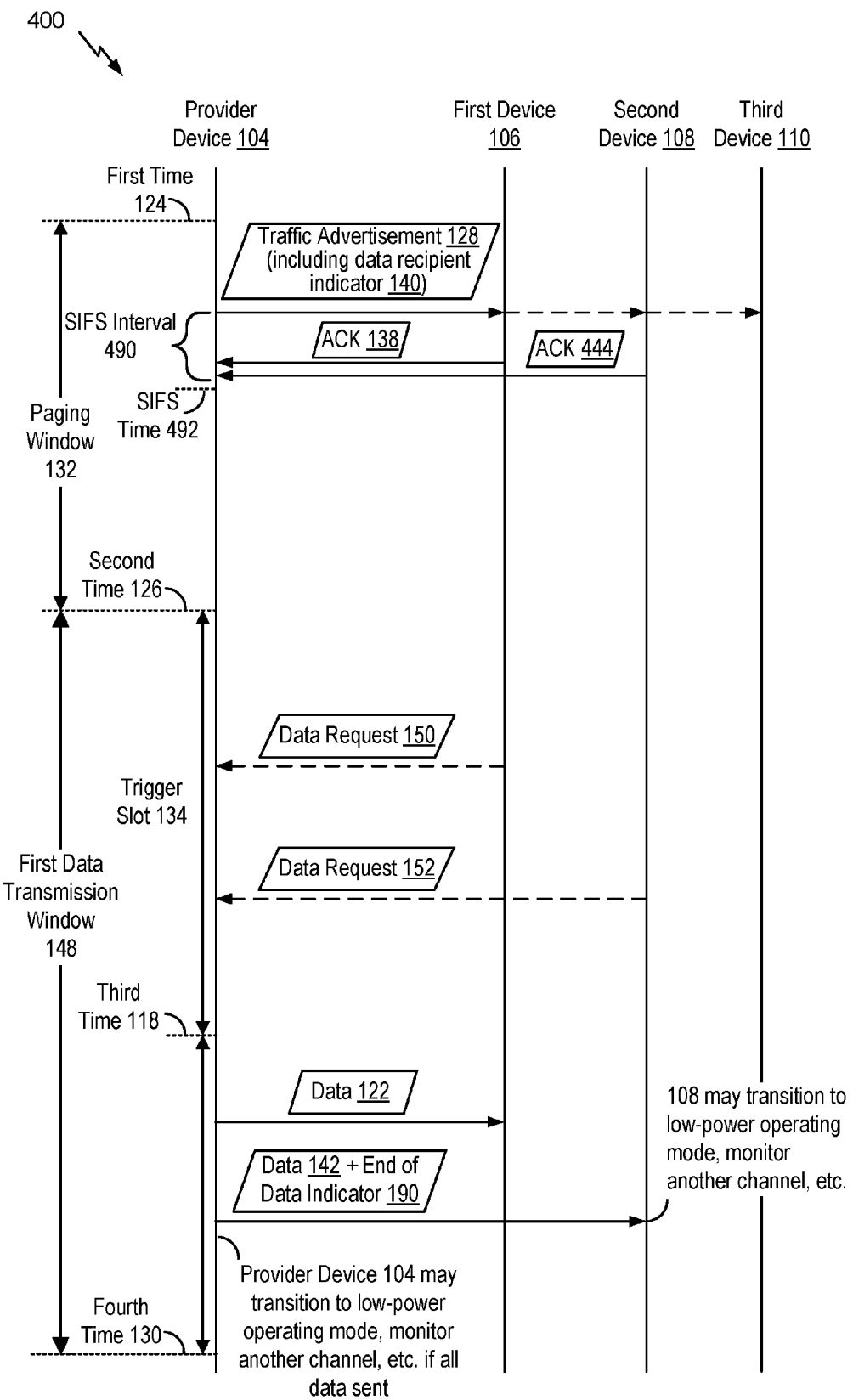
FIG. 4 is another illustrative ladder diagram corresponding to operation of the system of FIG. 1.

Referring to FIG. 4, a diagram is shown and generally designated diagram 400. In a particular aspect, the diagram 400 may correspond to operation of a particular aspect of the system described with reference to FIG. 1. The timing and operations shown in FIG. 4 are for illustration and are not limiting. In other aspects, additional or fewer operations may be performed and the timing may be different.

The diagram 400 may differ from the diagram 200 of FIG. 2 in that the provider device 104 may receive an ACK from one or more devices (e.g., the first device 106, the second device 108, or both) indicated by the data recipient indicator 140. The traffic advertisement 128 may include a unicast message addressed to the first device 106. The first device 106 may send the ACK 138 to the provider device 104 during the paging window 132 in response to determining that the traffic advertisement 128 is addressed to the first device 106, that the data recipient indicator 140 indicates the first device 106, that the traffic advertisement 128 is received from a device (e.g., the provider device 104) that is associated with the first device 106, that the first device 106 is available to receive traffic during at least portion of the first data transmission window 148 (or the ending portion of the first data transmission window 148), or a combination thereof.

The second device 108 may send an ACK 444 to the provider device 104 during the paging window 132 in response to determining that the data recipient indicator 140 indicates the second device 108, that the traffic advertisement 128 is received from a device (e.g., the provider device 104) that is associated with the second device 108, that the second device 108 is available to receive traffic during at least portion of the first data transmission window 148 (or an ending portion of the first data transmission window 148), or a combination thereof.

A subscriber device may send an ACK to the provider device 104 during a particular interval (e.g., a SIFS interval (SI) 490) of receiving the traffic advertisement 128. For example, the first device 106 may send the ACK 138 to the provider device 104 during the SI 490. As another example, the second device 108 may send the ACK 444 to the provider device 104 during the SI 490. The SI 490 may begin at a first time at (or near) which the traffic advertisement 128 is sent (or received) from the provider device 104. The SI 490 may end at a SIFS time 492. A duration of the SI 490 may be specified in an IEEE 802.11 standard. The provider device 104 may concurrently receive multiple ACKs (e.g., the ACK 138 and the ACK 444) during the paging window 132. For example, the provider device 104 may be configured to concurrently receive multiple ACKs from a plurality of devices during an interval (e.g., the SI 490) subsequent to sending the traffic advertisement 128. In a particular aspect, each of the plurality of devices may be configured to transmit a corresponding ACK using a distinct tone. For example, the first device 106 may transmit the ACK 138 using a first tone and the second device 108 may transmit the ACK 444 using a second tone. The distinct tones may enable the provider device 104 to distinguish between multiple ACKs that are received concurrently.

In a particular aspect, the provider device 104 may send a second traffic advertisement in response to determining that no ACK is received from the first device 106 and the second device 108 prior to the SIFS time 492. In a particular aspect, the provider device 104 may send the second traffic advertisement in response to determining that a first number of traffic advertisements sent during the paging window 132 fails to satisfy an advertising threshold, as described with reference to FIG. 1. In a particular aspect, the provider device 104 may transition to the second operating mode, as described with reference to FIG. 1, in response to determining that no ACKs are received from device (e.g., the first device 106 and the second device 108) indicated by the data recipient indicator 140 during the paging window 132.

The provider device 104 may conserve network resources or perform other actions by transitioning to the second operating mode during a remaining portion of the first data transmission window 148 when no ACK are received from data recipients during the paging window 132.

Figure 5:
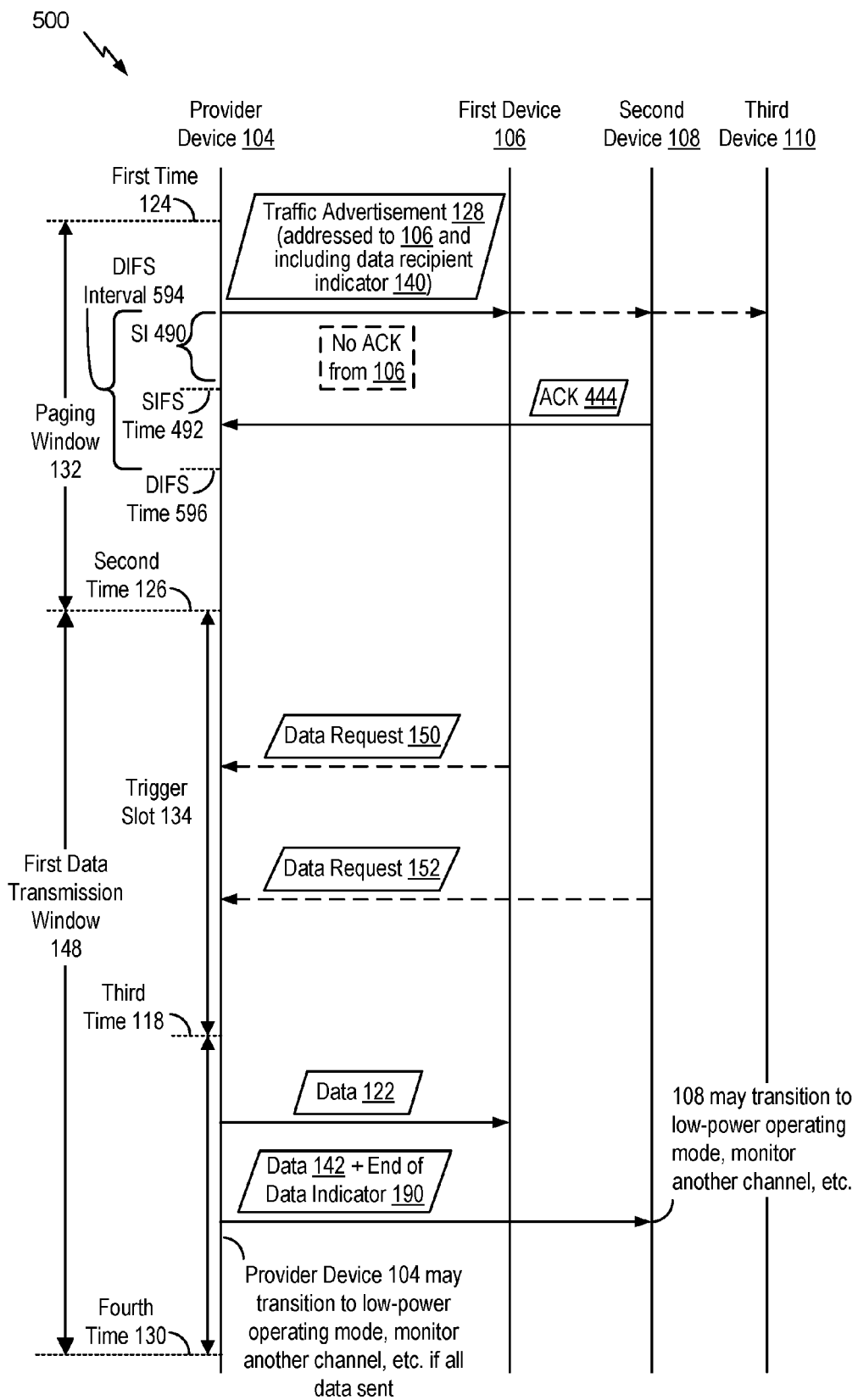
FIG. 5 is another illustrative ladder diagram corresponding to operation of the system of FIG. 1.

Referring to FIG. 5, a diagram is shown and generally designated diagram 500. In a particular aspect, the diagram 500 may correspond to operation of a particular aspect of the system described with reference to FIG. 1. The timing and operations shown in FIG. 5 are for illustration and are not limiting. In other aspects, additional or fewer operations may be performed and the timing may be different.

The diagram 500 may differ from the diagram 400 of FIG. 4 in that a non-addressed data recipient (e.g., the second device 108) may send an ACK responsive to the traffic advertisement 128 subsequent to the SI 490. For example, the traffic advertisement 128 may include a unicast message that is addressed to the first device 106. The second device 108 may receive the traffic advertisement 128 from the provider device 104. The second device 108 may determine that the traffic advertisement 128 is addressed to the first device 106, that no ACK is detected from the first device 106 to the provider device 104 during the SI 490, and that the data recipient indicator 140 indicates that the second device 108 is a data recipient. The second device 108 may, in response to the determination, send the ACK 444 to the provider device 104 subsequent to the SI 490.

A DIFS interval 594 may begin at a first time at (or near) which the traffic advertisement 128 is sent (or received) from the provider device 104. The DIFS interval 594 may end at a DIFS time 596. A duration of the DIFS interval 594 may be specified in an IEEE 802.11 standard. In a particular aspect, the second device 108 may send the ACK 444 to the provider device 104 prior to, upon, or subsequent to expiration of the DIFS interval 594. For example, the second device 108 may send the ACK 444 to the provider device 104 prior to, at, or subsequent to the DIFS time 596.

In a particular aspect, the second device 108 may set an access category of the ACK 444 to a first access category of a plurality of access categories. The first access category may correspond to a high-priority access category. The access category of the ACK 444 may indicate a higher priority than indicated by an access category of an ACK sent by an addressed device prior to the SIFS time 492. For example, the first device 106 may have set an access category of the ACK 138 of FIG. 1 to a second access category. The first access category may indicate a higher priority than a priority indicated by the second access category.

The plurality of access categories may be specified in an IEEE 802.11e standard. For example, the IEEE 802.11e standard may specify a medium access scheme of transmitting frames corresponding to the plurality of access categories. The ACK 444 may be transmitted based on the first access category. For example, the ACK 444 may be queued for transmission based on the first access category.

In a particular aspect, the provider device 104 may send a second traffic advertisement in response to determining that no ACK responsive to the traffic advertisement 128 has been received prior to a first time (e.g., approximately the DIFS time 596). The provider device 104 may send the second traffic advertisement in response to determining that a first number of traffic advertisements sent during the paging window 132 fails to satisfy an advertising threshold, as described with reference to FIG. 1.

The provider device 104 may not receive an ACK from the first device 106. The provider device 104 may remain in the first operating mode during a beginning portion of the first data transmission window 148 (or the trigger slot 134) in response to receiving the ACK 444 from the second device 108 during the paging window 132.

A subscriber device to which a traffic advertisement is not addressed may thus have more time, as compared to the system described with reference to FIG. 4, to determine whether a data recipient indicator indicates the subscriber device and to send an ACK based on the determination.

Figure 6:
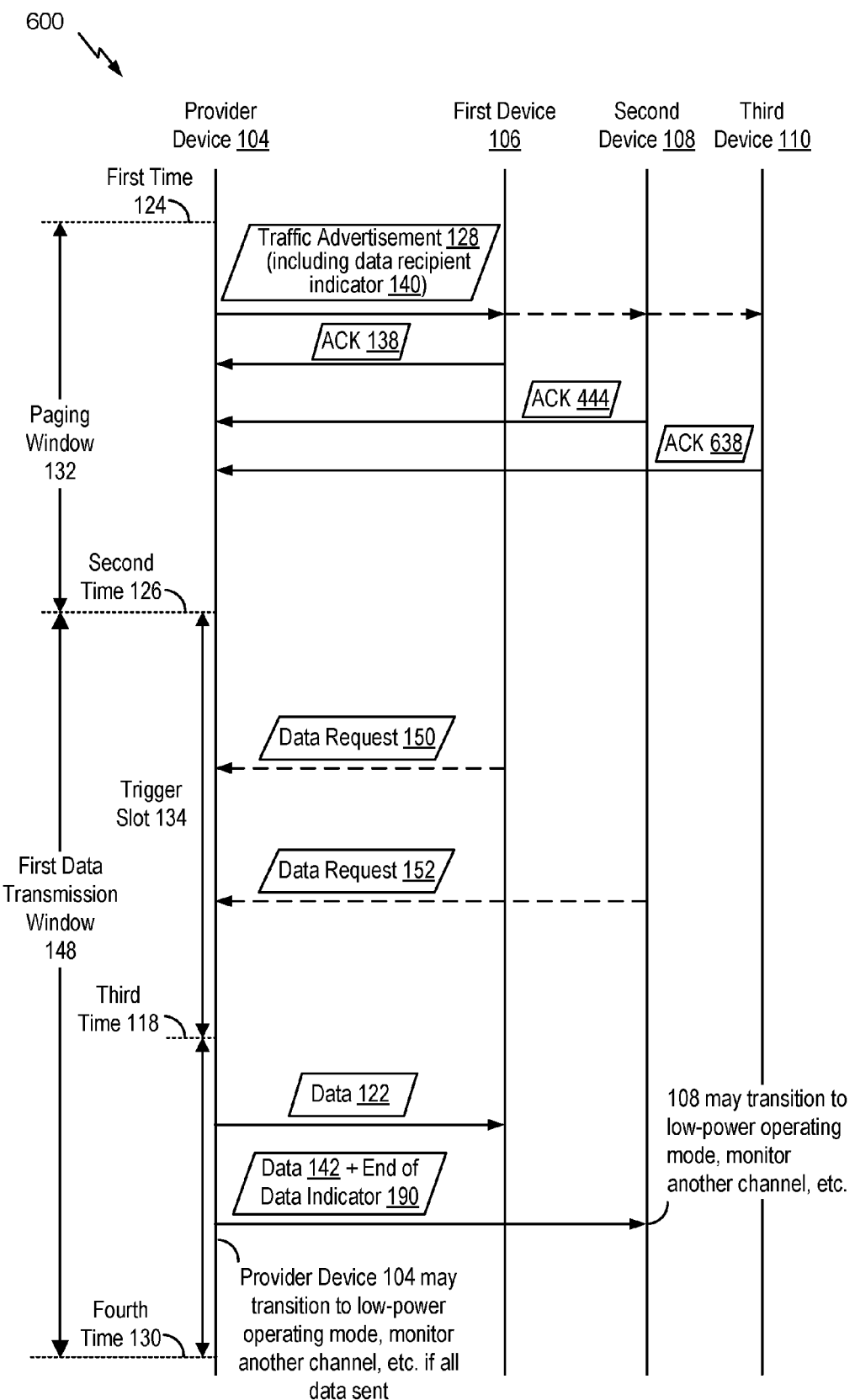
FIG. 6 is another illustrative ladder diagram corresponding to operation of the system of FIG. 1.

Referring to FIG. 6, a diagram is shown and generally designated diagram 600. In a particular aspect, the diagram 600 may correspond to operation of a particular aspect of the system described with reference to FIG. 1. The timing and operations shown in FIG. 6 are for illustration and are not limiting. In other aspects, additional or fewer operations may be performed and the timing may be different.

The diagram 600 may differ from the diagram 200 of FIG. 2 in that any device that receives the traffic advertisement 128 may send an ACK to the provider device 104. For example, the provider device 104 may receive the ACK 138 from the first device 106, the ACK 444 from the second device 108, an ACK 638 from the third device 110, or a combination thereof. The data recipient indicator 140 may indicate that the first device 106 and the second device 108 are data recipients, and that the third device 110 is not a data recipient.

In a particular aspect, a subscriber device (e.g., the device 106-110) that receives the traffic advertisement 128 from the provider device 104 may send an ACK to the provider device 104 in response to determining that the subscriber device is associated with the provider device 104. The subscriber device may determine that the subscriber device is associated with the provider device 104 in response to determining that the subscriber device and the provider device 104 have exchanged AIDs, as described with reference to FIG. 1.

In a particular aspect, the provider device 104 may send a second traffic advertisement in response to determining that no ACK responsive to the traffic advertisement 128 has been received during a first interval subsequent to sending the traffic advertisement 128. The provider device 104 may send the second traffic advertisement in response to determining that a first number of traffic advertisements sent during the paging window 132 fails to satisfy an advertising threshold, as described with reference to FIG. 1. The provider device 104 may transition to the second operating mode, as described with reference to FIG. 1, during a remaining portion of the paging window 132 in response to receiving at least one ACK during the paging window 132.

The provider device 104 may receive an ACK responsive to a traffic advertisement earlier because any device that receives the traffic advertisement may send an ACK to the provider device 104. The provider device 104 may conserve resources or perform other actions by transitioning to the second operating mode in response to receiving at least one ACK during the paging window 132.

Figure 7:
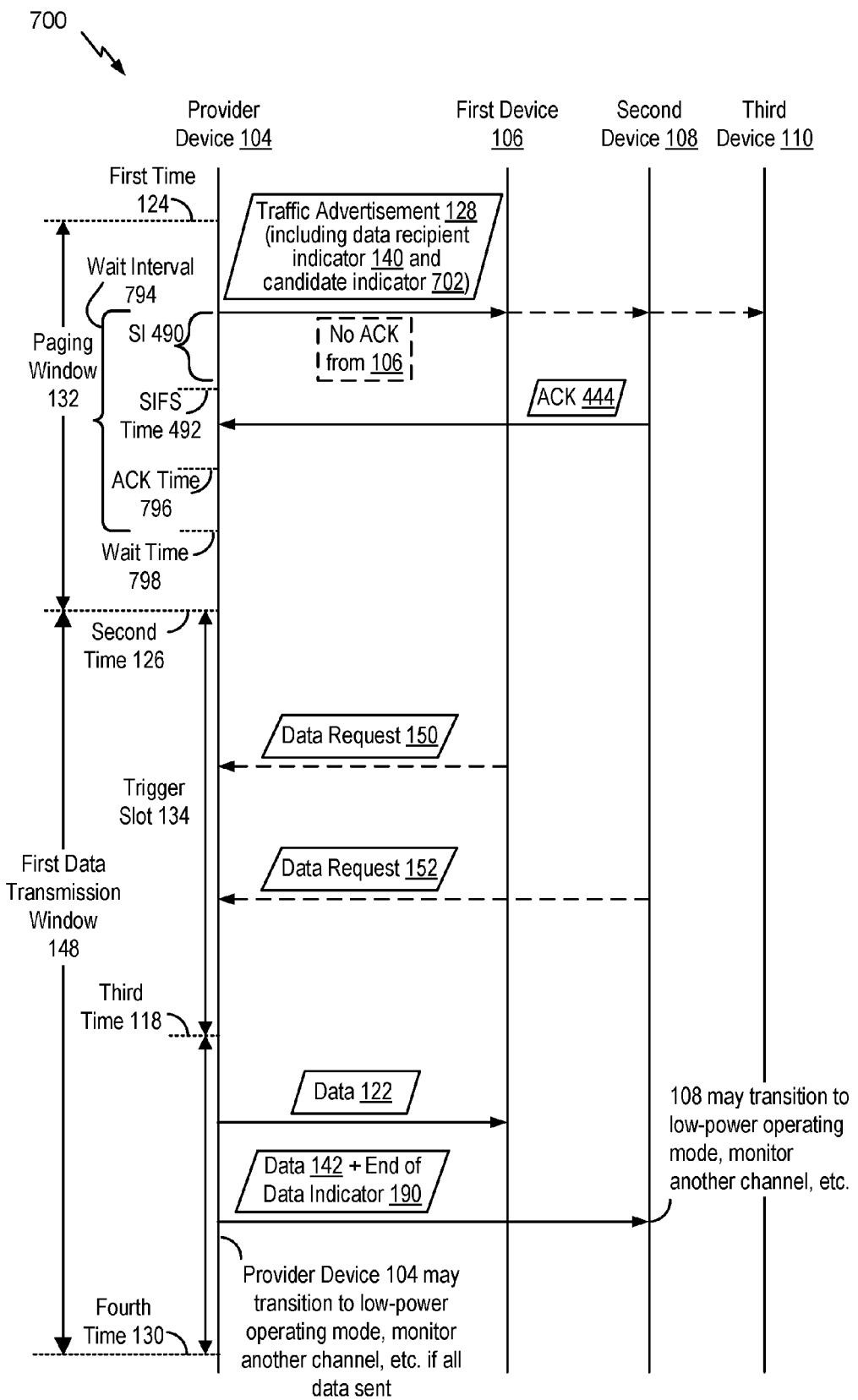
FIG. 7 is another illustrative ladder diagram corresponding to operation of the system of FIG. 1.

Referring to FIG. 7, a diagram is shown and generally designated diagram 700. In a particular aspect, the diagram 700 may correspond to operation of a particular aspect of the system described with reference to FIG. 1. The timing and operations shown in FIG. 7 are for illustration and are not limiting. In other aspects, additional or fewer operations may be performed and the timing may be different.

The diagram 700 may differ from the diagram 200 of FIG. 2 in that the traffic advertisement 128 may include a candidate indicator 702. The candidate indicator 702 may indicate one or more data recipients are candidates for sending an ACK responsive to the traffic advertisement 128. The data recipient indicator 140 may indicate the data recipients, as described with reference to FIG. 1. In a particular aspect, the data recipient indicator 140 may include the candidate indicator 702. For example, a position (e.g., second) of the second device 108 in a device order indicated by the data recipient indicator 140, as described with reference to FIG. 1, may indicate that the second device 108 is a candidate device.

The traffic advertisement 128 may include a unicast message addressed to the first device 106. The second device 108 may send the ACK 444 in response to determining that no ACK is detected from the first device 106 to the provider device 104 during the SI 490, that the candidate indicator 702 indicates that the second device 108 is a candidate data, that the data recipient indicator 140 indicates that the second device 108 is a data recipient, that the second device 108 is available to receive traffic during at least a portion of the first data transmission window 148 (or an ending portion of the first data transmission window 148), or a combination thereof.

In a particular aspect, the candidate indicator 702 may indicate candidate devices (e.g., the second device 108) in a candidate order. For example, a particular bit having a particular position (e.g., bit 3) in the candidate indicator 702 (e.g., a bit map) may correspond to the second device 108. Another bit having a second position (e.g., bit 5) in the candidate indicator 702 may correspond to another device. The particular bit and the other bit may each have a particular value (e.g., 1) indicating that the second device 108 and the other device are candidate devices, respectively. An order in which the particular bit (e.g., first) and the other bit (e.g., second) are indicated among bits of the candidate indicator 702 having the particular value may correspond to the candidate position. For example, the particular bit may be a first bit of the candidate indicator 702 that has the particular value (e.g., 1) and may correspond to a first candidate position (e.g., $1^{st}$). The other bit may be a next bit of the candidate indicator 702 that has the particular value (e.g., 1) and may correspond to a second candidate position (e.g., $2^{nd}$).

In a particular aspect, a subscriber device (e.g., the second device 108 or the other device) may determine an ACK range during which to send an ACK to the provider device 104 based on the SIFS time 492, a candidate position of the subscriber device indicated by the candidate indicator 702, and an ACK interval. For example, the second device 108 may determine an ACK time 796 based on the SIFS time 492, the first candidate position (e.g., $1^{st}$), and the ACK interval. To illustrate, the ACK time 796 may be equal to a sum of the SIFS time 492 and a first ACK delay. The first ACK delay may be a product of the first candidate position (e.g., 1) and the ACK interval. The ACK interval may be specified by an IEEE 802.11 standard. In a particular aspect, the traffic advertisement 128 may specify the ACK interval. The ACK interval may correspond to a difference between the SIFS time 492 and the ACK time 796. As another example, the other device 108 may determine another ACK time based on the SIFS time 492 and a second ACK delay. The second ACK delay may be a product of the second candidate position (e.g., 2) and the ACK interval. The second ACK delay may be longer than the first ACK delay.

The second device 108 may send the ACK 444 to the provider device 104 subsequent to the SIFS time 492 and prior to the ACK time 796. The other device may determine a previous ACK time (e.g., the ACK time 796) of a candidate device (e.g., the first device 106) having a previous candidate position (e.g., 1) in the candidate indicator 702. The other device may send an ACK to the provider device 104 subsequent to the previous ACK time (e.g., the ACK time 796) and prior to the other ACK time in response to determining that no ACK to the provider device 104 that is responsive to the traffic advertisement 128 has been detected prior to the previous ACK time (e.g., the ACK time 796).

In a particular implementation, a candidate device (e.g., the second device 108, the other device, or both) may send an ACK to the provider device 104 subsequent to the SIFS time 492 and prior to the ACK time 796 in response to determining that no ACK from the first device 106 to the provider device 104 is detected during the SI 490. In this implementation, the ACK time 796 may be determined based on a sum of the SIFS time 492 and the ACK interval.

A wait interval 794 may begin at a first time at (or near) which the second device 108 receives the traffic advertisement 128 from the provider device 104. The wait interval 794 may end at a wait time 798. Duration of the wait interval 794 may be specified by an IEEE 802.11 standard. In a particular aspect, the wait time 798 may correspond to a sum of the SIFS time 492 and a wait delay. The wait delay may correspond to a product of the ACK interval and a number of candidate devices indicated by the candidate indicator 702. In an alternate aspect, the wait delay may correspond to a product of the ACK interval and a maximum of the number of candidate devices and a default number (e.g., 2).

In a particular aspect, the provider device 104 may send a second traffic advertisement in response to determining that no ACK responsive to the traffic advertisement 128 has been received prior to the wait time 798. The provider device 104 may send the second traffic advertisement in response to determining that a first number of traffic advertisements sent during the paging window 132 fails to satisfy an advertising threshold, as described with reference to FIG. 1.

The provider device 104 may thus specify candidate devices that are to send an ACK when no ACK responsive to a traffic advertisement is detected from an addressed device to the provider device 104. Specifying the candidate devices may reduce a number of ACKs that are sent when an ACK from the addressed device is not detected. An ACK from a candidate device may indicate to the provider device 104 that at least one data recipient received the traffic advertisement.

Figure 8:
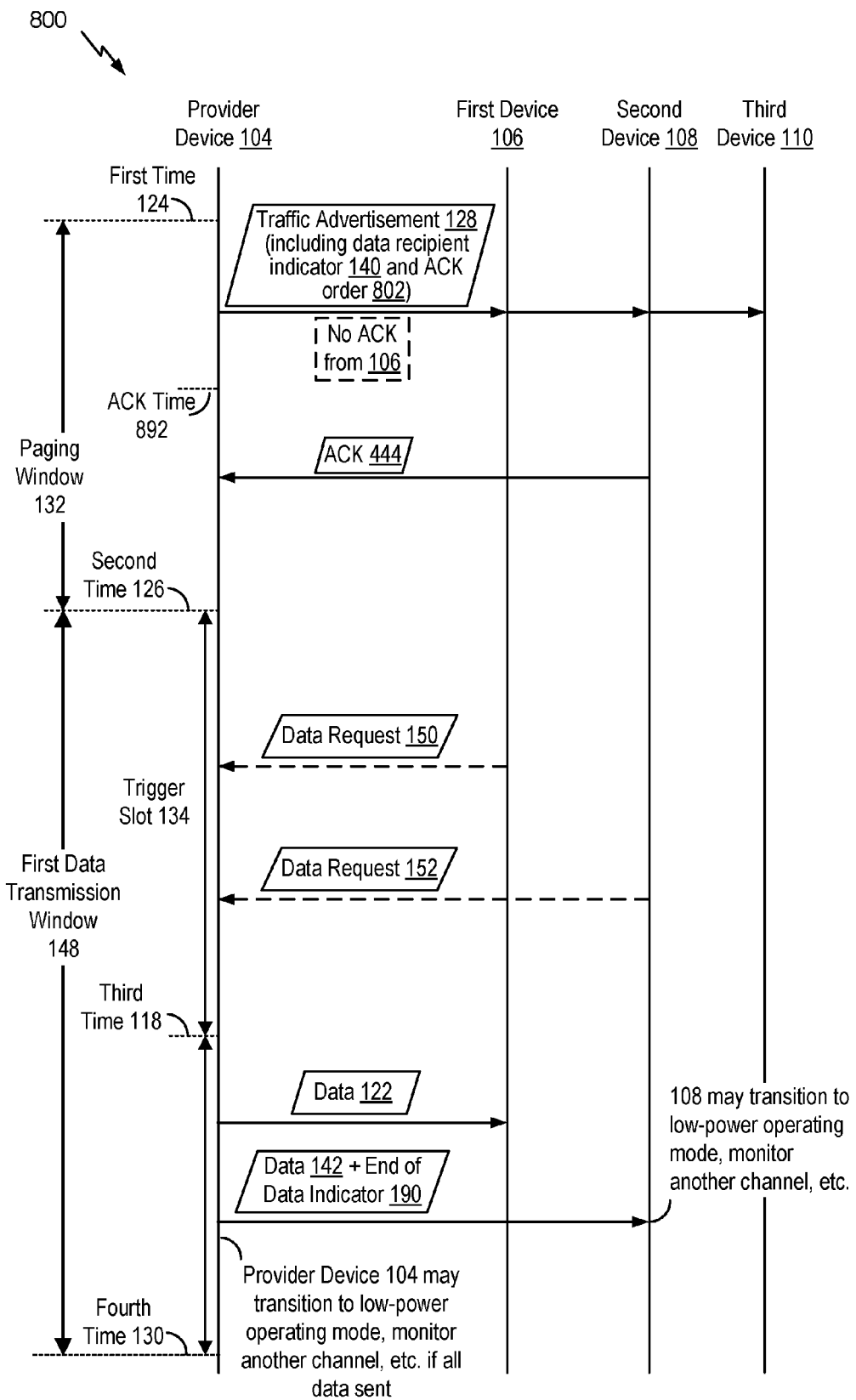
FIG. 8 is another illustrative ladder diagram corresponding to operation of the system of FIG. 1.

Referring to FIG. 8, a diagram is shown and generally designated diagram 800. In a particular aspect, the diagram 800 may correspond to operation of a particular aspect of the system described with reference to FIG. 1. The timing and operations shown in FIG. 8 are for illustration and are not limiting. In other aspects, additional or fewer operations may be performed and the timing may be different.

The diagram 800 may differ from the diagram 700 of FIG. 7 in that the traffic advertisement 128 may include a broadcast message. The data recipient indicator 140 may indicate data recipients (e.g., the first device 106 and the second device 108) in a device order. A data recipient (e.g., the first device 106, the second device 108, or both) may determine an ACK time based on a position of the data recipient in the device order. For example, the first device 106 may have a first position (e.g., 1) in the device order and the second device 108 may have a second position (e.g., 2) in the device order. The first device 106 may determine an ACK time 892 based on the first position, a first time at which the traffic advertisement 128 is received by the first device 106, the SI 490, an ACK interval, or a combination thereof. For example, an ACK time (e.g., the ACK time 892) of a data recipient may be determined based on the following equation:

$$ACK\ \text{time} = \text{first time} + SI\ 490 + ((\text{position} - 1) * ACK\ \text{interval}),\qquad \text{Equation 1}$$

where the first time corresponds to a time at which the data recipient received the traffic advertisement 128 and the position corresponds to a position of the data recipient in the device order. The ACK interval may be specified by an IEEE 802.11 standard. In a particular aspect, the traffic advertisement 128 may specify the ACK interval.

In a particular aspect, the traffic advertisement 128 may include an ACK order 802. The ACK order 802 may indicate the device order of the devices indicated by the data recipient indicator 140 as data recipients.

The first device 106 may determine the ACK time 892 based on Equation 1. For example, the ACK time 892 may correspond to a sum of the first time and the SI 490. The first device 106 may send the ACK 138 subsequent to the first time and prior to the ACK time 892. The second device 108 may determine a second ACK time based on Equation 1. For example, the second ACK time may correspond to a sum of the first time, the SI 490, and the ACK interval. The second device 108 may determine a previous ACK time (e.g., the ACK time 892) corresponding to a data recipient (e.g., the first device 106) having a previous position (e.g., 1) in the device order. The second device 108 may send a second ACK to the provider device 104 in response to determining that no ACK is detected to the provider device 104 prior to the previous ACK time (e.g., the ACK time 892). The second device 108 may send the second ACK prior to the second ACK time.

In a particular aspect, the provider device 104 may determine a wait time. The wait time may correspond to a sum of the first time, the SI 490, and a wait delay. The wait delay may correspond to a product of the ACK interval and a number of data recipients indicated by the data recipient indicator 140. In an alternate aspect, the wait delay may correspond to a product of the ACK interval and a maximum of the number of data recipients and a default number (e.g., 3 or 4).

In a particular aspect, the provider device 104 may send a second traffic advertisement in response to determining that no ACK responsive to the traffic advertisement 128 has been received prior to the wait time. The provider device 104 may send the second traffic advertisement in response to determining that a first number of traffic advertisements sent during the paging window 132 fails to satisfy an advertising threshold, as described with reference to FIG. 1.

Any data recipient may send an ACK responsive to a traffic advertisement. Sending the ACK during an interval that is based on a position of the data recipient in a device order may reduce a likelihood of network collision among ACKs from multiple data recipients.

Figure 9:
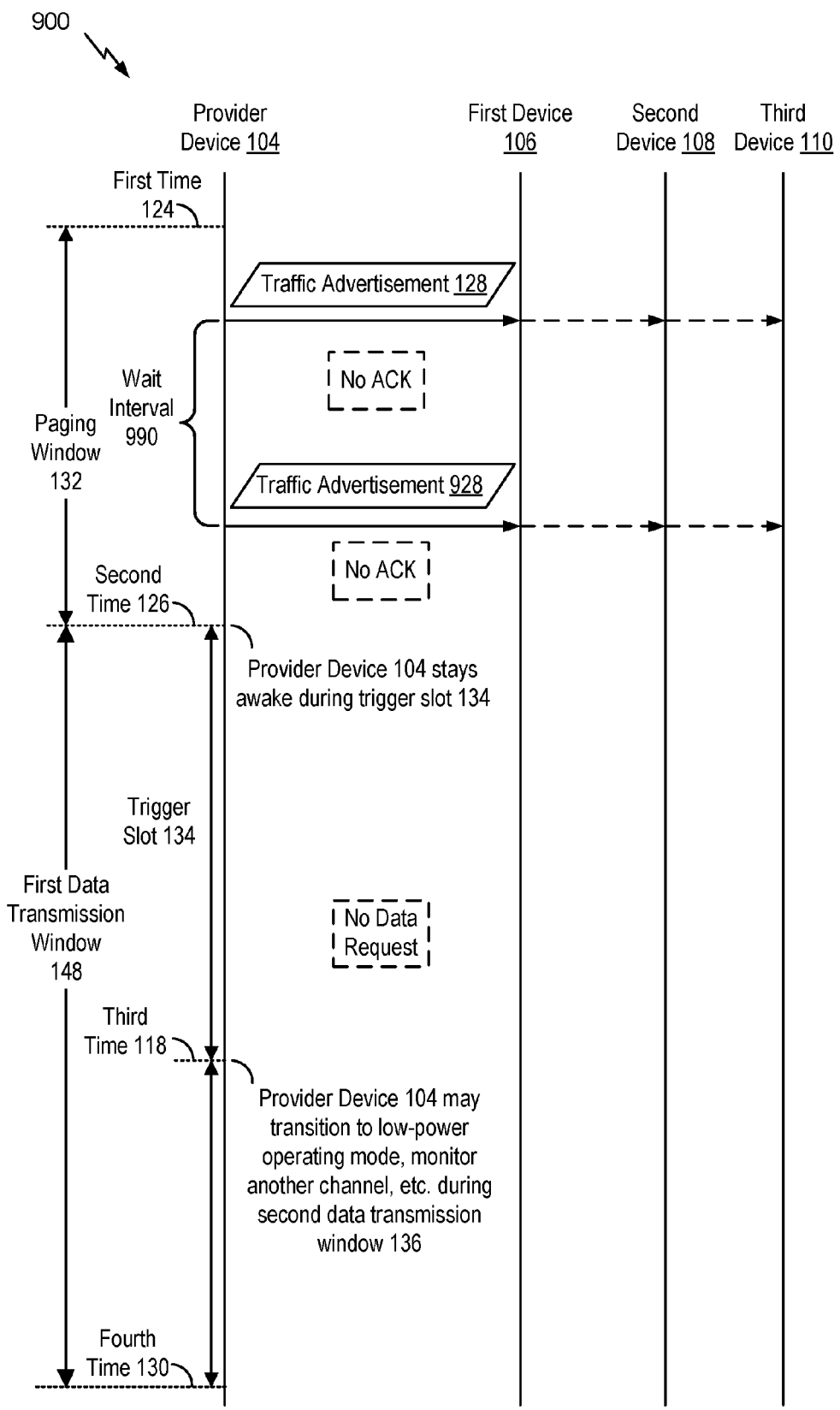
FIG. 9 is another illustrative ladder diagram corresponding to operation of the system of FIG. 1.

Referring to FIG. 9, a diagram is shown and generally designated diagram 900. In a particular aspect, the diagram 900 may correspond to operation of a particular aspect of the system described with reference to FIG. 1. The timing and operations shown in FIG. 9 are for illustration and are not limiting. In other aspects, additional or fewer operations may be performed and the timing may be different.

The diagram 900 may differ from the diagram 300 of FIG. 3 in that the provider device 104 send a traffic advertisement 928 in response to determining that no ACK responsive to the traffic advertisement 128 is received during a wait interval 990. The traffic advertisement 928 may correspond to the second traffic advertisement described with reference to at least one of the FIGS. 2 and 4-8. The wait interval 990 may correspond to the SI 490, the DIFS interval 594, the wait interval 794, or another interval.

Sending another traffic advertisement may increase a likelihood of receiving an ACK. For example, none of the devices may receive the traffic advertisement 128 and at least one of the devices may receive the traffic advertisement 928. The provider device 104 may receive an ACK from at least one of the devices that received the traffic advertisement 928.

Figure 10:
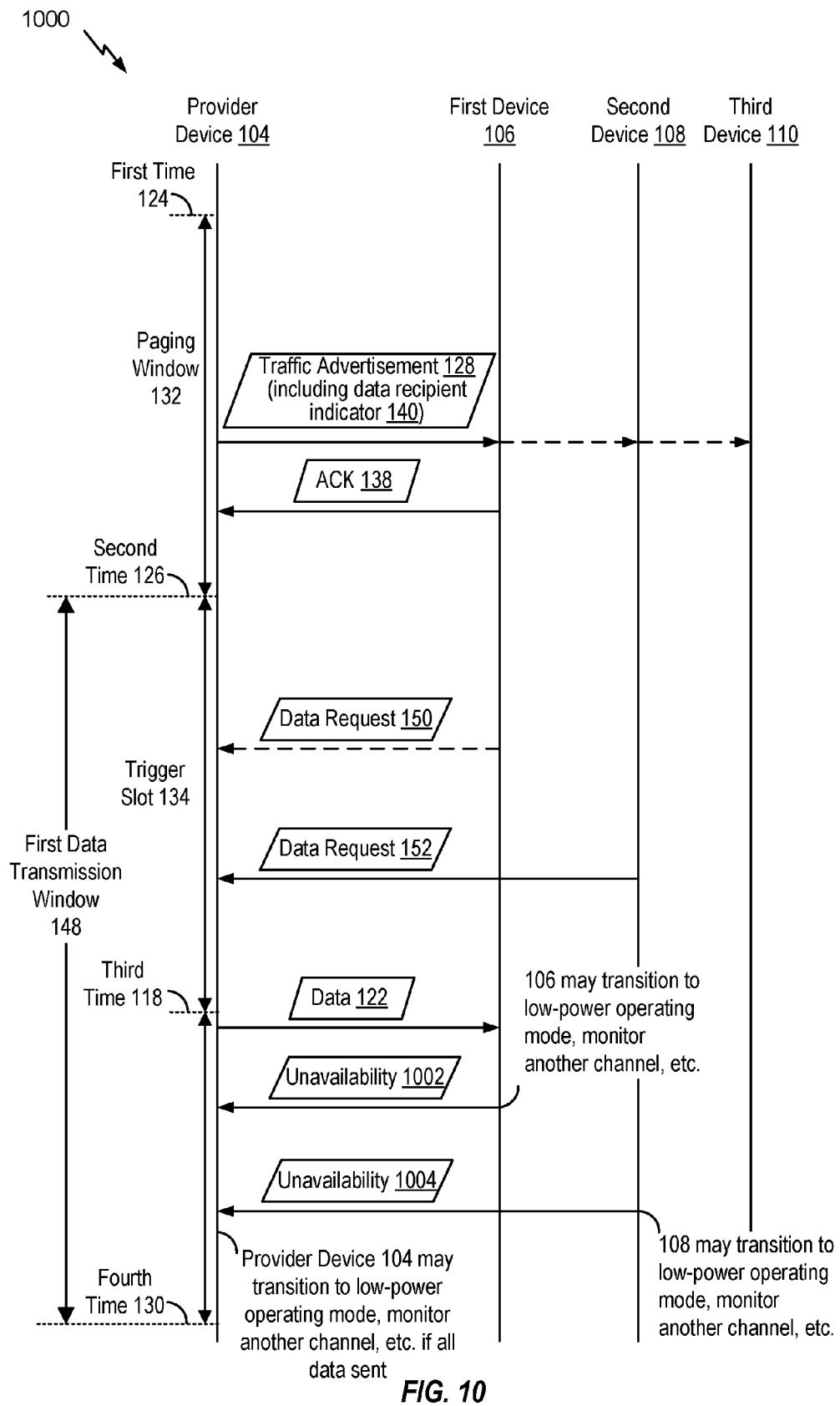
FIG. 10 is another illustrative ladder diagram corresponding to operation of the system of FIG. 1.

Referring to FIG. 10, a diagram is shown and generally designated diagram 1000. In a particular aspect, the diagram 1000 may correspond to operation of a particular aspect of the system described with reference to FIG. 1. The timing and operations shown in FIG. 10 are for illustration and are not limiting. In other aspects, additional or fewer operations may be performed and the timing may be different.

The diagram 1000 may differ from the diagram 100 of FIG. 1 in that a data recipient indicated by the data recipient indicator 140 may send an unavailability message to the provider device 104. For example, the first device 106 may send an unavailability message 1002 to the provider device 104 subsequent to receiving the data 122 during the first data transmission window 148 (or an ending portion of the first data transmission window 148). As another example, the second device 108 may send an unavailability message 1004 to the provider device 104 prior to receiving any data from the provider device 104 during the first data transmission window 148 (or an ending portion of the first data transmission window 148).

The provider device 104 may receive the unavailability message 1004 from the second device 108 during the first data transmission window 148 (or an ending portion of the first data transmission window 148). The provider device 104 may refrain from sending data (or additional data) to a data recipient during a remaining portion of the first data transmission window 148 in response to receiving the unavailability message from the data recipient. For example, the provider device 104 may refrain from sending additional data to the first device 106 during the first data transmission window 148 in response to receiving the unavailability message 1002 from the first device 106. As another example, the provider device 104 may refrain from sending the data 142 to the second device 108 during the first data transmission window 148 in response to receiving the unavailability message 1004 from the second device 108.

An unavailability message may include a QoS_NULL frame or another frame. A particular bit of a particular field of a header of a frame may be set to a particular value (e.g., 1) to indicate that the frame corresponds to the unavailability message. For example, a power management bit of a frame control field of a header of a QoS_NULL frame or another frame may be set to a particular value (e.g., 1) to indicate that the frame corresponds to the unavailability message 1002.

In a particular aspect, the provider device 104 may, in response to receiving an unavailability message from a data recipient, retain data (or additional data) to be sent to the data recipient in a subsequent transmission window. For example, the provider device 104 may retain the data 142 to send to the second device 108 in a subsequent transmission window. To illustrate, the provider device 104 may send a second traffic advertisement during a second transmission window that indicates that the provider device 104 has data to send to the second device 108. Data to be sent to the second device 108 during the second transmission window may include the retained data 142.

In a particular implementation, the provider device 104 may send the traffic advertisement 128 via a first communication channel during the paging window 132, as described with reference to FIG. 1. The first device 106 may, in response to receiving the traffic advertisement 128, send the ACK 138 via the first communication channel to the provider device 104 during the paging window 132. Alternatively, or in addition, the first device 106 may send the data request 150 via a second communication channel to the provider device 104 during the trigger slot 134 or a beginning portion of the first data transmission window 148.

The first device 106 may send the ACK 138, the data request 150, or both, in response to determining that the first device 106 is available to communicate, via the second communication channel, with the provider device 104 during at least a portion of the first data transmission window 148. Subsequently, the first device 106 may determine that the first device 106 is unavailable to receive traffic via the second communication channel from the provider device 104 during a remaining portion of the first data transmission window 148. In a particular implementation, the first device 106 may receive the data 122 via the second communication channel from the provider device 104 during the first data transmission window 148 and may determine that the first device 106 is unavailable to receive additional data via the second communication channel from the provider device 104 during a remaining portion of the first data transmission window 148.

The first device 106 may be unavailable to receive traffic for various reasons. For example, the first device 106 may be unavailable to receive traffic because the first device 106 may be transitioning to the second operating mode during the remaining portion of the first data transmission window 148.

The first device 106 may generate the unavailability message 1002 in response to determining that the first device 106 is unavailable to receive traffic (e.g., data) via the second communication channel from the provider device 104 during the remaining portion of the first data transmission window. The first device 106 may send the unavailability message 1002 via the second communication channel to the provider device 104 during the first data transmission window. In a particular aspect, the first device 106 may transition to the second operating mode subsequent to sending the unavailability message 1002. For example, the first device 106 may transition to the second operating mode in response to determining that the first device 106 is not scheduled to monitor any communication channels during a remaining portion of the first data transmission window 148.

The provider device 104 may refrain from sending the data 122 or additional data via the second communication channel to the first device 106 during a remaining portion of the first data transmission window 148 in response to receiving the unavailability message 1002 from the first device 106. The provider device 104 may identify a set of available data recipients in response to receiving the unavailability message 1002. The provider device 104 may transition to the second operating mode during a remaining portion of the first data transmission window 148 in response to determining that there is no data to send to the set of available data recipients during the remaining portion of the first data transmission window 148.

A data recipient may send an unavailability message to inform a provider device when the data recipient becomes unavailable to receive data. The provider device may conserve resources (e.g., network usage, power, or both) or may perform other operations by transitioning to the second operating mode in response to receiving the unavailability message from the data recipient.

Figure 11:
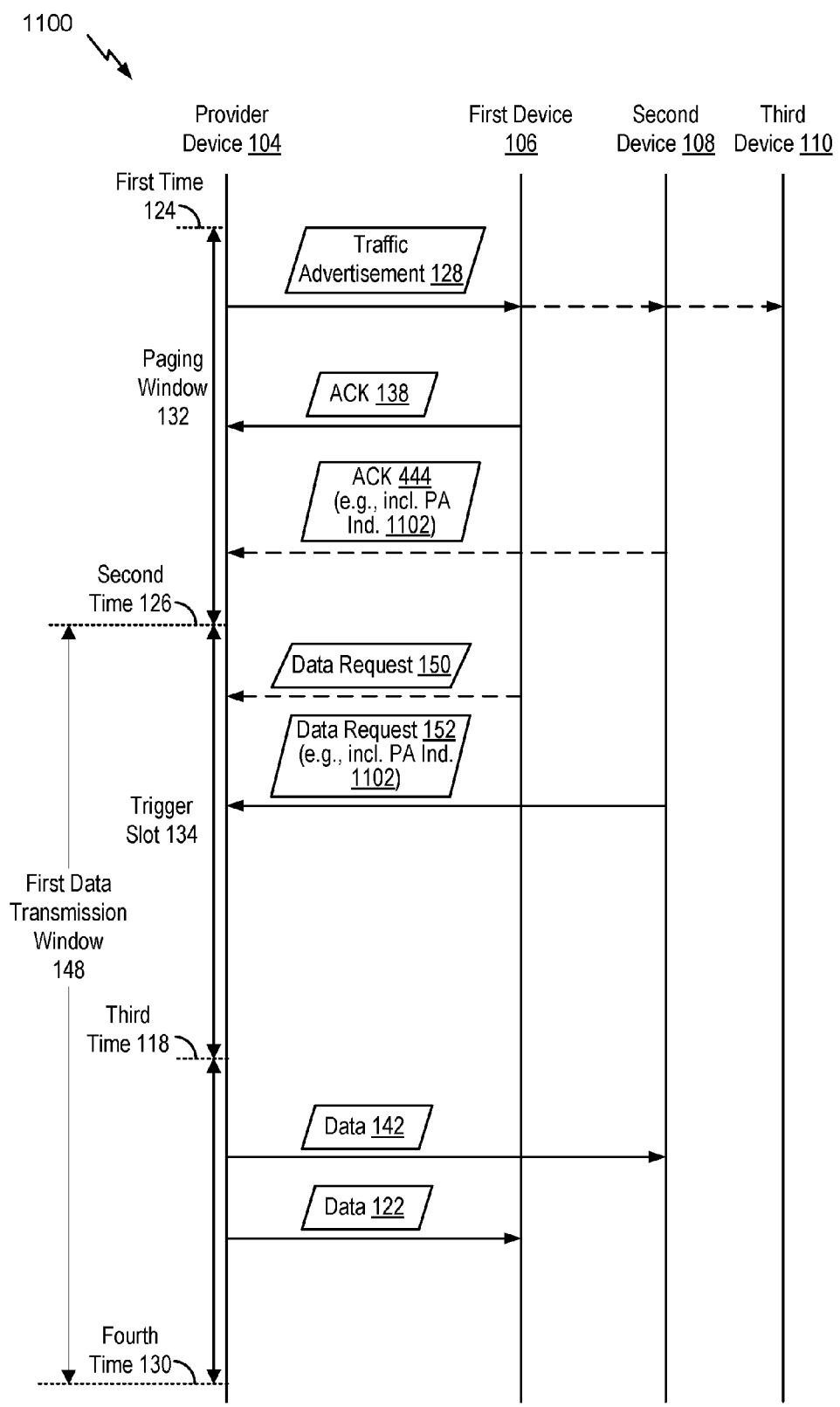
FIG. 11 is another illustrative ladder diagram corresponding to operation of the system of FIG. 1.

Referring to FIG. 11, a diagram is shown and generally designated diagram 1100. In a particular aspect, the diagram 1100 may correspond to operation of a particular aspect of the system described with reference to FIG. 1. The timing and operations shown in FIG. 11 are for illustration and are not limiting. In other aspects, additional or fewer operations may be performed and the timing may be different.

The diagram 1100 may differ from the diagram 100 of FIG. 1 in that a data recipient may, subsequent to receiving the traffic advertisement 128 from the provider device 104, send a partial availability message to the provider device 104. The partial availability message may include an ACK, a data request, a trigger frame, or another message. A partial availability indication 1102 may be included in the partial availability message. The second device 108 may send the partial availability message (e.g., the ACK 444, the data request 152, a trigger frame, or another message) including the partial availability indication 1102 to the provider device 104. In a particular aspect, a particular bit of the partial availability message (e.g., an ACK, a data request, a trigger frame, or another message) may correspond to a partial availability indication when the particular bit has a particular value (e.g., 1). A trigger frame may be the same as or distinct from the data request 152. For example, a trigger frame may include one or more fields that are distinct from the data request 152. A trigger frame may include one or more fields that are the same as the data request 152.

In a particular implementation, the provider device 104 may send the traffic advertisement 128 via a first communication channel during the paging window 132, as described with reference to FIG. 1. A subscriber device may, in response to receiving the traffic advertisement 128, send an ACK via the first communication channel to the provider device 104 during the paging window 132. Alternatively, or in addition, the subscriber device may send a data request via a second communication channel to the provider device 104 during the trigger slot 134, the first data transmission window 148, or a beginning portion of the first data transmission window 148. For example, the first device 106 may, in response to receiving the traffic advertisement 128, send the ACK 138 via the first communication channel to the provider device 104 during the paging window 132. Alternatively, or in addition, the first device 106 may send the data request 150 via a second communication channel to the provider device 104 during the trigger slot 134, the first data transmission window 148, or a beginning portion of the first data transmission window 148.

The second device 108 may determine that the second device 108 is expected to be partially available during the first data transmission window 148. For example, the second device 108 may determine that the second device 108 is expected to be unavailable to receive data during a portion of the first data transmission window 148. To illustrate, the second device 108 may be scheduled to transition to the second operating mode during at least a portion of the first data transmission window 148. The second device 108 may generate a partial availability message in response to determining that the second device 108 is expected to be partially available during the first data transmission window 148. For example, the second device 108 may include the partial availability indication 1102 in the ACK 444, the data request 152, a trigger frame, or a combination thereof, in response to determining that the second device 108 is expected to be partially available during the first data transmission window 148.

The second device 108 may send the partial availability message via the first communication channel (or the second communication channel) to the provider device 104 during the paging window 132 (or the first data transmission window 148). For example, the second device 108 may send the ACK 444 with the partial availability indication 1102 via the first communication channel to the provider device 104 during the paging window 132. The second device 108 may send the data request 152 with the partial availability indication 1102 via the second communication channel to the provider device 104 during the trigger slot 134 or a beginning portion of the first data transmission window 148.

The provider device 104 may receive the partial availability message. The partial availability indication 1102 may indicate that the second device 108 is expected to be unavailable during a portion of the first data transmission window 148. The provider device 104 may prioritize sending data to a data recipient in response to receiving a partial availability message from the data recipient. For example, the provider device 104 may prioritize sending the data 142 to the second device 108 in response to determining that the ACK 444, the data request 152, or both, include the partial availability indication 1102. To illustrate, the provider device 104 may send the data 142 to the second device 108 prior to sending the data 122 to the first device 106 in response to determining that the ACK 444, the data request 152, or both include the partial availability indication 1102 and that the ACK 138, the data request 150, or both, do not include a partial availability indication.

A data recipient may send a partial availability message to inform a provider device that the data recipient is expected to be unavailable during at least a portion of a data transmission window. The provider device may prioritize sending data to the data recipient in response to receiving the partial availability message from the data recipient to increase a likelihood of the data recipient receiving the data.

Figure 12:
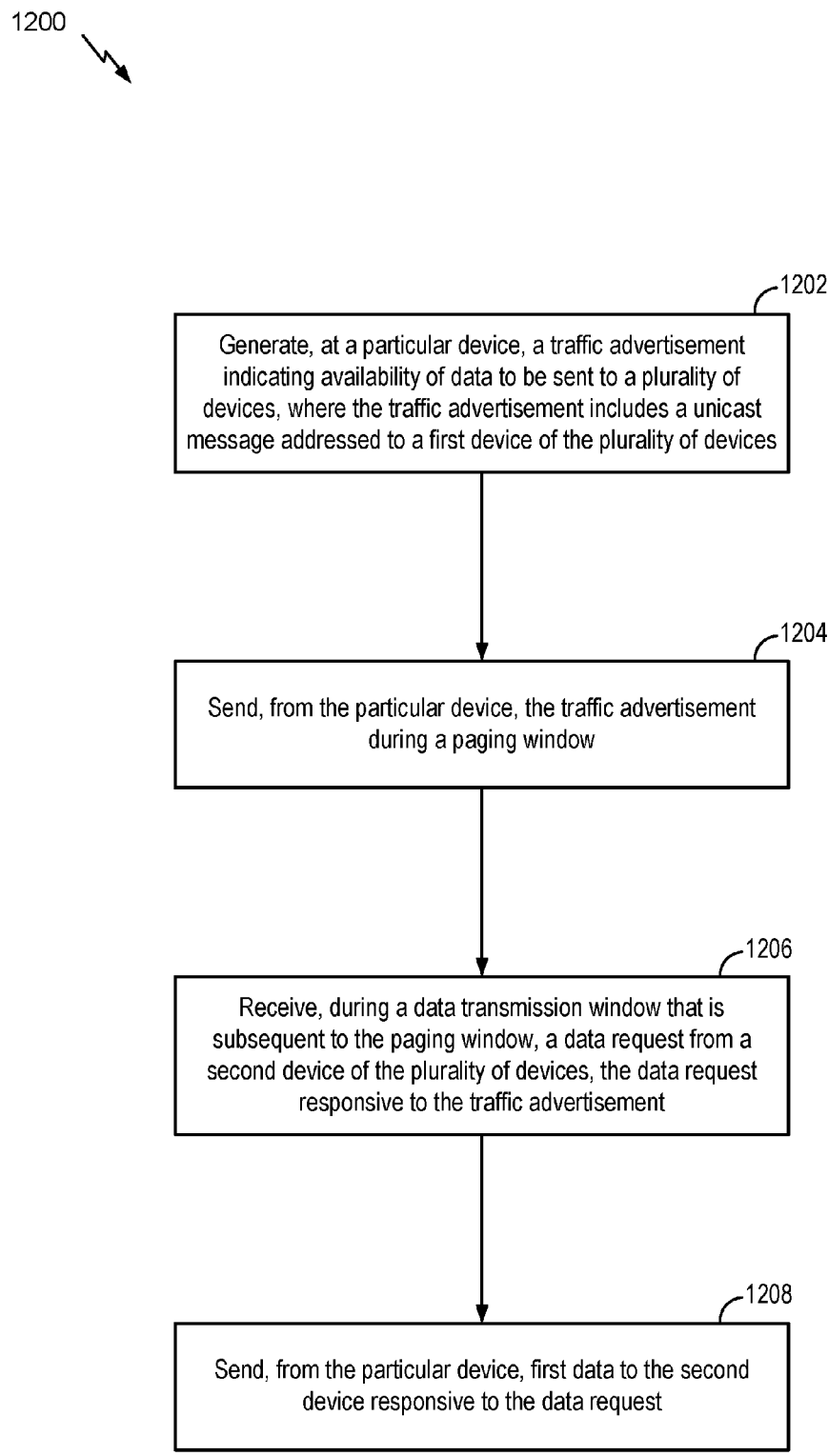
FIG. 12 is a flowchart of a method of traffic advertisement.

Referring to FIG. 12, a flowchart of an aspect of a method of traffic advertisement is shown and generally designated 1200. The method 1200 may be performed by the provider device 104 of FIG. 1.

The method 1200 includes generating, at a particular device, a traffic advertisement indicating availability of data to be sent to a plurality of devices, at 1202. For example, the provider device 104 of FIG. 1 may generate the traffic advertisement 128 indicating availability of data to be sent to the first device 106 and the second device 108, as described with reference to FIG. 1. The traffic advertisement 128 may include a unicast message addressed to the first device 106, as described with reference to FIG. 1.

The method 1200 also includes sending, from the particular device, the traffic advertisement during a paging window, at 1204. For example, the provider device 104 of FIG. 1 may send the traffic advertisement 128 during the paging window 132, as described with reference to FIG. 1.

The method 1200 further includes receiving, during a data transmission window that is subsequent to the paging window, a data request from a second device of the plurality of devices, at 1206. For example, the provider device 104 of FIG. 1 may receive, during the first data transmission window 148, the data request 152 from the second device 108, as described with reference to FIG. 1. The first data transmission window 148 may be subsequent to the paging window 132. The data request 152 may be responsive to the traffic advertisement 128.

The method 1200 also includes sending, from the particular device, first data to the second device responsive to the data request, at 1208. For example, the provider device 104 of FIG. 1 may send the data 142 to the second device 108 responsive to the data request 152, as described with reference to FIG. 1.

The method 1200 may thus enable the provider device 104 to advertise availability of data for multiple subscriber devices using a unicast message. A particular subscriber device may send a data request responsive to the traffic advertisement 128 that corresponds to a unicast message addressed to another subscriber device. For example, the second device 108 may send the data request 152 in response to determining that the traffic advertisement 128 indicates availability of data to be sent to the second device 108. The second device 108 may send the data request 152 irrespective of whether the traffic advertisement 128 is addressed to the second device 108. The provider device 104 may send the data 142 to the second device 108 responsive to the data request 152.

Figure 13:
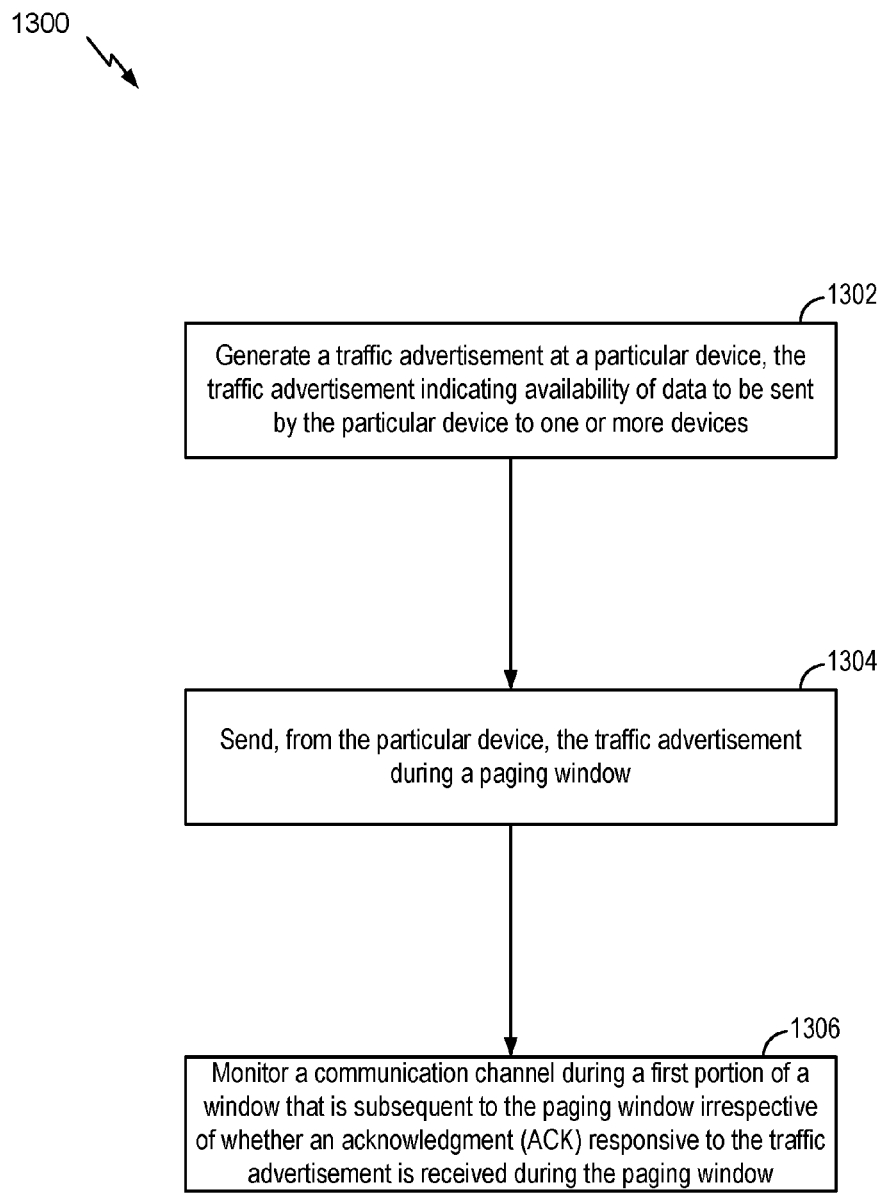
FIG. 13 is a flowchart of a method of traffic advertisement.

Referring to FIG. 13, a flowchart of an aspect of a method of traffic advertisement is shown and generally designated 1300. The method 1300 may be performed by the provider device 104 of FIG. 1.

The method 1300 includes generating a traffic advertisement at a particular device, at 1302. For example, the provider device 104 of FIG. 1 may generate the traffic advertisement 128, as described with reference to FIG. 1. The traffic advertisement 128 may indicate availability of data to be sent by the provider device 104 to one or more devices (e.g., at least one of the first device 106, the second device 108, or the third device 110), as described with reference to FIG. 1.

The method 1300 also includes sending, from the particular device, the traffic advertisement during a paging window, at 1304. For example, the provider device 104 of FIG. 1 may send the traffic advertisement 128 during the paging window 132, as described with reference to FIG. 1.

The method 1300 further includes monitoring a communication channel during a first portion of a window that is subsequent to the paging window irrespective of whether an acknowledgment (ACK) responsive to the traffic advertisement is received during the paging window, at 1306. For example, the provider device 104 of FIG. 1 may monitor a communication channel during the trigger slot 134 irrespective of whether an ACK responsive to the traffic advertisement 128 is received during the paging window 132. To illustrate, the provider device 104 may receive the ACK 138 responsive to the traffic advertisement 128 during the paging window 132 and may monitor a communication channel during the trigger slot 134, as described with reference to FIG. 1. Alternatively, the provider device 104 may receive no ACK responsive to the traffic advertisement 128 during the paging window 132 and may monitor a communication channel during the trigger slot 134, as described with reference to FIG. 2. The paging window 132 may correspond to a portion of the first data transmission window 148 of FIG. 1. The first data transmission window 148 may be subsequent to the paging window 132.

The method 1300 may thus enable the provider device 104 to increase a likelihood that data is sent to a subscriber device by monitoring a communication channel during the trigger slot 134 irrespective of receiving an ACK responsive to the traffic advertisement 128 during the paging window 132. For example, the second device 108 may receive the traffic advertisement 128 during the paging window 132 and may send the data request 152, via a communication channel, during the trigger slot 134, as described with reference to FIG. 2. The provider device 104 may monitor the communication channel during the trigger slot 134 irrespective of receiving an ACK responsive to the traffic advertisement 128 during the paging window 132. The provider device 104 may receive the data request 152, via the communication channel, from the second device 108 during the trigger slot 134. The provider device 104 may send the data 142 to the second device 108 during the first data transmission window 148.

Figure 14:
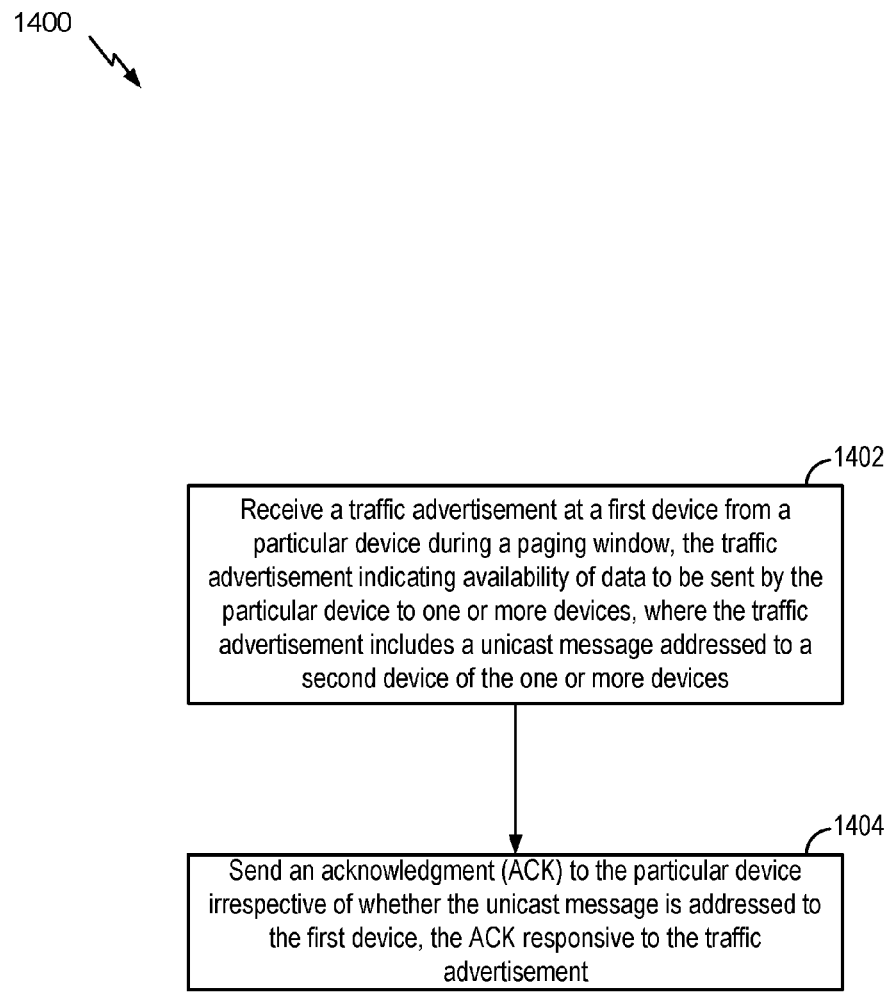
FIG. 14 is a flowchart of a method of traffic advertisement.

Referring to FIG. 14, a flowchart of an aspect of a method of traffic advertisement is shown and generally designated 1400. The method 1400 may be performed by the first device 106, the second device 108, the third device 110 of FIG. 1, or a combination thereof.

The method 1400 includes receiving a traffic advertisement at a first device from a particular device during a paging window, at 1402. For example, the second device 108 of FIG. 1 may receive the traffic advertisement 128 from the provider device 104 during the paging window 132, as described with reference to FIG. 1. The traffic advertisement 128 may indicate availability of data to be sent by the provider device 104 to one or more devices (e.g., at least one of the first device 106, the second device 108, or the third device 110). The traffic advertisement 128 may include a unicast message addressed to the first device 106.

The method 1400 also includes sending an acknowledgment (ACK) to the particular device irrespective of whether the unicast message is addressed to the first device, at 1404. For example, the second device 108 may send the ACK 444 to the provider device 104 irrespective of whether the traffic advertisement 128 (e.g., a unicast message) is addressed to the second device 108, as described with reference to FIGS. 4-5. To illustrate, the traffic advertisement 128 may correspond to a unicast message addressed to the first device 106 and the second device 108 may send the ACK 444. The ACK 444 may be responsive to the traffic advertisement 128.

In a particular aspect, the second device 108 may send the ACK 444 in response to determining that the traffic advertisement 128 indicates availability of data to be sent to the second device 108. For example, the traffic advertisement 128 may indicate availability of data to be sent to one or more devices, as described with reference to FIG. 1, and the second device 108 may send the ACK 444 in response to determining that the one or more devices include the second device 108 (e.g., a receiver of the second device 108). In an alternate aspect, the second device 108 may send the ACK 444 irrespective of whether the traffic advertisement 128 indicates availability of data to be sent to the second device 108. For example, the traffic advertisement 128 may indicate availability of data to be sent to one or more devices, as described with reference to FIG. 1, and the second device 108 may send the ACK 444 irrespective of whether the second device 108 (e.g., a receiver of the second device 108) is included in the one or more devices.

The method 1400 may thus enable a subscriber device (e.g., the first device 106, the second device 108, or both) to send an ACK responsive to the traffic advertisement 128 irrespective of whether the traffic advertisement 128 is addressed to the subscriber device. The method 1400 may increase a likelihood that the provider device 104 receives an ACK responsive to the traffic advertisement 128 from at least one subscriber device.

Figure 15:
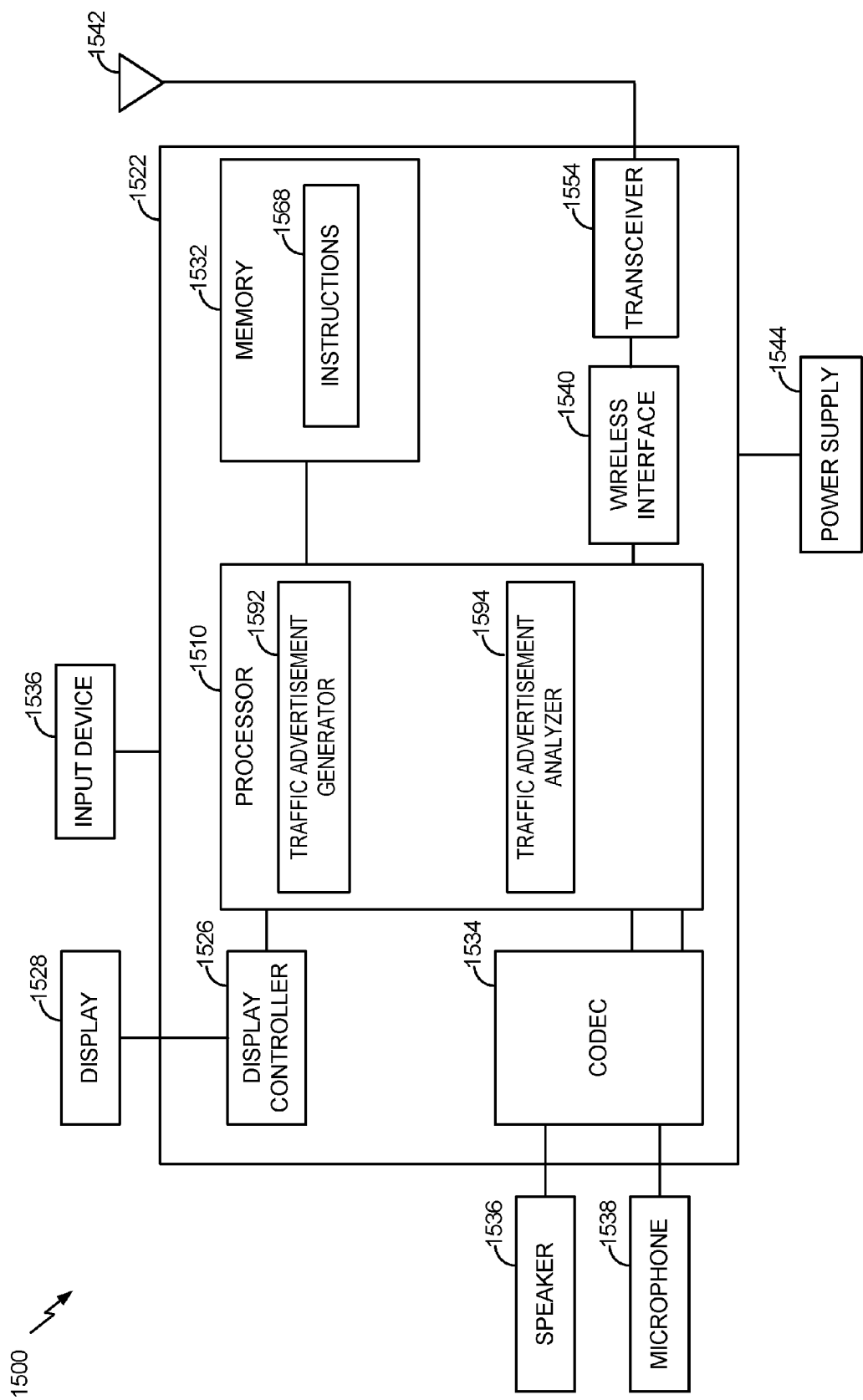
FIG. 15 is a diagram of a wireless device that is operable to support various aspects of one or more methods, systems, apparatuses, and computer-readable media disclosed herein.

Referring to FIG. 15, a particular illustrative aspect of a wireless communication device is depicted and generally designated 1500. The device 1500 includes a processor 1510, such as a digital signal processor, coupled to a memory 1532. In an illustrative aspect, the device 1500, or components thereof, may correspond to the device 104-110 of FIG. 1 or components thereof. The processor 1510 may include a traffic advertisement generator 1592, a traffic advertisement analyzer 1594, or both. The traffic advertisement generator 1592 may be configured to perform one or more operations that are described herein as being performed by the provider device 104. The traffic advertisement analyzer 1594 may be configured to perform one or more operations that are described herein as being performed by the device 106-110.

The processor 1510 may be configured to execute software (e.g., a program of one or more instructions 1568) stored in the memory 1532. Additionally or alternatively, the processor 1510 may be configured to implement one or more instructions stored in a memory of a wireless interface 1540 (e.g., an Institute of Electrical and Electronics Engineers (IEEE) 802.11 compliant interface). For example, the wireless interface 1540 may be configured to operate in accordance with one or more wireless communication standards, including one or more IEEE 802.11 standards and one or more NAN standards. In a particular aspect, the processor 1510 may be configured to perform one or more operations or methods described with reference to FIGS. 1-14. For example, the processor 1510 may be configured to monitor one or more communication channels during one or more associated paging windows, one or more trigger slots, one or more data transmission windows, one or more portions of data transmission windows, or a combination thereof. The processor 1510 may be configured to generate the traffic advertisement 128 of FIG. 1 and to send the traffic advertisement 128 via one or more communication channels. The processor 1510 may be configured to receive the ACK 138 of FIG. 1, the ACK 444 of FIG. 4, the ACK 638 of FIG. 6, or a combination thereof, via one or more communication channels. The processor 1510 may be configured to receive the data request 150, the data request 152 of FIG. 1, or both via one or more communication channels. The processor 1510 may be configured to send the data 122, the data 142 of FIG. 1, or both, via one or more communication channels. The processor 1510 may be configured to transition to the first operating mode, as described with reference to FIG. 1. The processor 1510 may be configured to transition to the second operating mode, as described with reference to FIG. 1. The processor 1510 may be configured to monitor one or more communication channels during one or more paging windows, one or more trigger slots, one or more data transmission windows, one or more portions of data transmission windows, or a combination thereof.

As another example, the processor 1510 may be configured to receive the traffic advertisement 128 of FIG. 1, the traffic advertisement 928, or both, via one or more communication channels. The processor 1510 may be configured to send the ACK 138 of FIG. 1, the ACK 444 of FIG. 4, the ACK 638 of FIG. 6, or a combination thereof, via one or more communication channels. The processor 1510 may be configured to send the data request 150, the data request 152 of FIG. 1, or both, via one or more communication channels. The processor 1510 may be configured to receive the data 122, the data 142 of FIG. 1, or both, via one or more communication channels.

The wireless interface 1540 may be coupled to the processor 1510 and to an antenna 1542. For example, the wireless interface 1540 may be coupled to the antenna 1542 via a transceiver 1554, such that wireless data may be received via the antenna 1542 and may be provided to the processor 1510.

A coder/decoder (CODEC) 1534 can also be coupled to the processor 1510. A speaker 1536 and a microphone 1538 can be coupled to the CODEC 1534. A display controller 1526 can be coupled to the processor 1510 and to a display device 1528. In a particular aspect, the processor 1510, the display controller 1526, the memory 1532, the CODEC 1534, and the wireless interface 1540 are included in a system-in-package or system-on-chip device 1522. In a particular aspect, an input device 1530 and a power supply 1544 are coupled to the system-on-chip device 1522. Moreover, in a particular aspect, as illustrated in FIG. 15, the display device 1528, the input device 1530, the speaker 1536, the microphone 1538, the antenna 1542, and the power supply 1544 are external to the system-on-chip device 1522. However, each of the display device 1528, the input device 1530, the speaker 1536, the microphone 1538, the antenna 1542, and the power supply 1544 can be coupled to one or more components of the system-on-chip device 1522, such as one or more interfaces or controllers. In a particular aspect, the device 1500 may include at least one of a communications device, a music player, a video player, an entertainment unit, a navigation device, a personal digital assistant (PDA), a mobile device, a computer, a decoder, or a set top box.

Those of skill in the art would further appreciate that the various illustrative logical blocks, configurations, modules, circuits, and algorithm steps described in connection with the aspects disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the aspects disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (e.g., non-transitory) storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A method of communication comprising:
generating, at a particular device, a traffic advertisement indicating availability of data to be sent to a plurality of devices, wherein the traffic advertisement includes a unicast message addressed to a first device of the plurality of devices;
transmitting the traffic advertisement from the particular device during a paging window;
receiving, during a data transmission window that is subsequent to the paging window, a data request at the particular device from a second device of the plurality of devices, the data request responsive to the traffic advertisement; and
in response to receiving the data request, transmitting first data from the particular device to the second device.

2. The method of claim 1, further comprising receiving, at the particular device, an acknowledgment (ACK) during a Short Interframe Space (SIFS) interval subsequent to transmitting the traffic advertisement.

3. The method of claim 1, further comprising:
in response to determining that a count of a set of devices satisfies a threshold, generating a second traffic advertisement indicating availability of traffic to be sent to a subset of the set of devices, wherein the second traffic advertisement indicates a destination address; and
transmitting the second traffic advertisement from the particular device during a second paging window.

4. The method of claim 3, further comprising, irrespective of receipt of an acknowledgment (ACK) responsive to the second traffic advertisement, monitoring a communication channel during a portion of a window that is subsequent to the second paging window.

5. The method of claim 4, wherein the destination address includes a broadcast address, a data link group address, or a data link identifier.

6. The method of claim 3, further comprising, in response to receipt of an acknowledgment (ACK) during an interval subsequent to transmitting the second traffic advertisement, monitoring a communication channel during a portion of a window that is subsequent to the second paging window.

7. The method of claim 6, wherein the destination address includes a data link identifier.

8. A device for communication comprising:
a processor configured to generate a traffic advertisement indicating availability of data to be sent to a plurality of devices, wherein the traffic advertisement includes a unicast message addressed to a first device of the plurality of devices;
a transmitter configured to transmit the traffic advertisement during a paging window; and
a receiver configured to receive, during a data transmission window that is subsequent to the paging window, a data request from a second device of the plurality of devices, the data request responsive to the traffic advertisement,
wherein the transmitter is further configured to send first data to the second device responsive to the data request.

9. The device of claim 8, wherein the receiver is further configured to receive an acknowledgment (ACK) during a Short Interframe Space (SIFS) interval subsequent to sending the traffic advertisement.

10. The device of claim 9, wherein the ACK is received from the first device.

11. The device of claim 9, wherein the ACK is received from a particular device of the plurality of devices and wherein the particular device is distinct from the first device.

12. The device of claim 9, wherein the ACK is received from a particular device and the particular device is not included in the plurality of devices.

13. The device of claim 8, wherein the receiver is further configured to concurrently receive multiple acknowledgments (ACKs) from the plurality of devices during an interval subsequent to sending the traffic advertisement.

14. The device of claim 8, wherein the transmitter is further configured to, in response to determining that no acknowledgment (ACK) is received during an interval subsequent to sending the traffic advertisement, send a second traffic advertisement during the paging window subsequent to the interval.

15. The device of claim 8, wherein the processor is further configured to, in response to determining that a count of a set of devices satisfies a threshold, generate a second traffic advertisement indicating availability of traffic to be sent to a subset of the set of devices, wherein the second traffic advertisement indicates a destination address, and wherein the transmitter is further configured to transmit the second traffic advertisement during a second paging window.

16. The device of claim 15, wherein the destination address includes a broadcast address, a data link group address, or a data link identifier, and wherein the transmitter is further configured to, irrespective of receipt of an acknowledgment (ACK) responsive to the second traffic advertisement, monitor a communication channel during a portion of a window that is subsequent to the second paging window.

17. The device of claim 15, wherein the destination address includes a data link identifier, and wherein the transmitter is further configured to, in response to receipt of an acknowledgment (ACK) during an interval subsequent to sending the second traffic advertisement, monitor a communication channel during a portion of a window that is subsequent to the second paging window.

18. The device of claim 8, wherein the receiver is further configured to receive a partial availability indication from the second device subsequent to sending the traffic advertisement, the partial availability indication indicating that the second device is expected to be unavailable during a portion of the data transmission window, wherein the transmitter is further configured to, in response to receipt of the partial availability indication from the second device, send the first data to the second device during the data transmission window prior to sending second data to a particular device of the plurality of devices during the data transmission window, and wherein the partial availability indication is included in the data request, in a trigger frame, in an acknowledgment (ACK), or in another message.

19. The device of claim 8, wherein the receiver is further configured to receive an unavailability message from the second device during the data transmission window, the unavailability message indicating that the second device is unavailable to receive traffic during a remaining portion of the data transmission window, and wherein the transmitter is further configured to, in response to receipt of the unavailability message, refrain from sending second data to the second device during the remaining portion of the data transmission window.

20. The device of claim 8, wherein the transmitter is further configured to transmit a first frame, a value of a duration field of a header of the first frame indicating a network allocation vector (NAV) interval that is greater than a threshold, wherein the first frame includes the traffic advertisement, and wherein the transmitter is further configured to, in response to receipt of an acknowledgment (ACK) during an interval subsequent to sending of the traffic advertisement, transmit a contention free end (CF-end) frame.

21. A computer-readable storage device storing instructions that, when executed by a processor, cause the processor to perform operations comprising:
generating a traffic advertisement indicating availability of data to be sent to a plurality of devices, wherein the traffic advertisement includes a unicast message addressed to a first device of the plurality of devices;
initiating transmission of the traffic advertisement during a paging window;
receiving, during a data transmission window that is subsequent to the paging window, a data request from a second device of the plurality of devices, the data request responsive to the traffic advertisement; and
in response to receiving the data request, initiating transmission of first data to the second device.

22. The computer-readable storage device of claim 21, wherein the operations further comprise:
receiving a partial availability indication from the second device subsequent to transmission of the traffic advertisement, the partial availability indication indicating that the second device is expected to be unavailable during a portion of the data transmission window, wherein the partial availability indication is included in the data request, in a trigger frame, in an acknowledgment (ACK), or in another message; and
in response to receipt of the partial availability indication from the second device, initiating transmission of the first data to the second device during the data transmission window prior to sending second data to a particular device of the plurality of devices during the data transmission window.

23. The computer-readable storage device of claim 21, wherein the operations further comprise:
receiving an unavailability message from the second device during the data transmission window, the unavailability message indicating that the second device is unavailable to receive traffic during a remaining portion of the data transmission window; and in response to receipt of the unavailability message, refrain from initiating transmission of second data to the second device during the remaining portion of the data transmission window.

24. The computer-readable storage device of claim 21, wherein the operations further comprise:

initiating transmission of a first frame, a value of a duration field of a header of the first frame indicating a network allocation vector (NAV) interval that is greater than a threshold, wherein the first frame includes the traffic advertisement; and in response to receipt of an acknowledgment (ACK) during an interval subsequent to transmission of the traffic advertisement, initiating transmission of a contention free end (CF-end) frame.

25. The computer-readable storage device of claim 21, wherein the operations further comprise receiving an acknowledgment (ACK) during a Short Interframe Space (SIFS) interval subsequent to transmission of the traffic advertisement.

26. The computer-readable storage device of claim 25, wherein the ACK is received from the first device.

27. The computer-readable storage device of claim 25, wherein the ACK is received from a particular device of the plurality of devices and wherein the particular device is distinct from the first device.

28. The computer-readable storage device of claim 25, wherein the ACK is received from a particular device and the particular device is not included in the plurality of devices.

29. An apparatus for communication comprising:

means for generating a traffic advertisement indicating availability of data to be sent to a plurality of devices, wherein the traffic advertisement includes a unicast message addressed to a first device of the plurality of devices;

means for transmitting the traffic advertisement during a paging window;

means for receiving a data request from a second device of the plurality of devices, the data request received during a data transmission window that is subsequent to the paging window, wherein the data request responsive to the traffic advertisement; and means for transmitting first data to the second device responsive to the data request.

30. The apparatus of claim 29, wherein the means for generating the traffic advertisement, the means for transmitting the traffic advertisement, the means for receiving the data request, and the means for transmitting the first data are integrated into at least one of a communications device, a music player, a video player, an entertainment unit, a navigation device, a personal digital assistant (PDA), a mobile device, a computer, a decoder, or a set top box.

* * * * *